(12) United States Patent
Tomioka et al.

(10) Patent No.: US 6,590,627 B2
(45) Date of Patent: Jul. 8, 2003

(54) LIQUID CRYSTAL DISPLAY

(75) Inventors: Yasushi Tomioka, Hitachi (JP); Yoshiyuki Umeda, Hitachi (JP); Katsumi Kondo, Mito (JP)

(73) Assignee: Hitachi, Ltd., Tokyo (JP)

( * ) Notice: Subject to any disclaimer, the term of this patent is extended or adjusted under 35 U.S.C. 154(b) by 131 days.

(21) Appl. No.: 09/929,126

(22) Filed: Aug. 15, 2001

(65) Prior Publication Data
US 2002/0140891 A1 Oct. 3, 2002

(30) Foreign Application Priority Data
Feb. 28, 2001 (JP) ........................... 2001-053826

(51) Int. Cl.[7] ............................................ G02F 1/1343
(52) U.S. Cl. .................... 349/139; 349/141; 349/106
(58) Field of Search ................................ 349/141, 106, 349/122, 138, 139, 110

(56) References Cited

U.S. PATENT DOCUMENTS

| 6,162,654 A | * 12/2000 | Kawabe ...................... 438/30 |
| 6,198,520 B1 | * 3/2001 | Kondo et al. ............... 349/141 |
| 6,222,602 B1 | * 4/2001 | Aratani et al. .............. 349/141 |
| 6,236,441 B1 | * 5/2001 | Aratani et al. .............. 349/141 |
| 6,417,898 B1 | * 7/2002 | Izumi .......................... 349/73 |

FOREIGN PATENT DOCUMENTS

| JP | A-4-253028 | 9/1992 |
| JP | A-6-160878 | 6/1994 |
| JP | A-6-202127 | 7/1994 |
| JP | A-9-73101 | 3/1997 |
| JP | A-11-190865 | 7/1999 |
| JP | A-2000-111957 | 4/2000 |

* cited by examiner

Primary Examiner—Robert H. Kim
Assistant Examiner—David Y. Chung
(74) Attorney, Agent, or Firm—Antonelli, Terry, Stout & Kraus, LLP

(57) ABSTRACT

The present invention provides a liquid crystal display of high image quality which can be driven at a low voltage and shows a lowered inhomogeneity of display caused by an after image phenomenon.

The liquid crystal display comprises one pair of substrates which are a first substrate and a second substrate, at least one of which is transparent, a liquid crystal layer and a color filter layer provided between the two substrates, a plurality of thin film transistors provided on the first substrate and connected to an image signal wiring and a scanning signal wiring, a common electrode giving a standard potential, and a pixel electrode connected to the thin film transistors and placed opposite to the common electrode in a pixel region, wherein the common electrode and pixel electrode are placed in different layers from each other through an interlaminar insulating film in the form of layer comprising at least two layers comprising the color filter layer.

20 Claims, 10 Drawing Sheets

LIQUID CRYSTAL DISPLAY

FIELD OF THE INVENTION

The present invention relates to an active matrix type liquid crystal display.

BACKGROUND OF THE INVENTION

In usual liquid crystal displays, an electric field is applied to liquid crystal molecules in a liquid crystal layer held between one pair of substrates to change a direction of orientation of the liquid crystal molecules, and thereby caused change in the optical characteristics of the liquid crystal layer is utilized for making display.

Among the prior active driving type liquid crystal displays, typical is the Twisted Nematic (TN) Display mode in which an electrode is provided on each of the two substrates holding a liquid crystal between themselves, the direction of electric field applied to the liquid crystal is made roughly perpendicular to the substrate interface, and the optical rotatory power of the liquid crystal is utilized for making display. This TN type liquid crystal display has a fault that the viewing angle is narrow.

Thus, there has been proposed the in-plane switching (IPS) mode in which an interdigital electrode is used to make the generated electric field have a component roughly parallel to the substrate surface, and the liquid crystal is rotated nearly within a plane, and a birefringence of liquid crystal is used for making display (for example, JP-A-6-202127 and JP-A-6-160878). This IPS mode has a merit that it is based on the in-plane switching of liquid crystal molecules so that it has a wider viewing angle as compared with the prior TN mode and at the same time it has a lower storage capacitance. Thus, IPS is considered hopeful and able to replace the prior TN liquid crystal displays, and is making a rapid progress in the recent years. Further, an IPS mode in which either one electrode to which electric field is applied is constructed from a transparent electrically conductive film and thereby transmittance is improved has also been proposed (JP-A-9-73101). Such liquid crystal displays excellent in viewing angle characteristics (contrast ratio, gray scale reversal) and high in brightness are potent techniques aiming at monitors and televisions of wide display region.

When a high-resolution is to be given to liquid crystal display, a higher precision of overlapping is required between the substrate surface on which thin film transistor (TFT) is formed (active matrix substrate) and the substrate surface on which color filter layer (CF layer) is formed. A decrease in the precision of overlapping, namely a decrease in the precision of the alignment between black matrix and scanning electrode wirings and image signal wirings, causes a drop in a practical aperture ratio, and further causes a decrease in the contrast ratio due to exposure of the originally unseen domains in the light-screened region, which brings about a decrease in the performance of high-resolution display. Thus, in the prior vertical TN mode, a technique of taking CF layer and light-shielding black matrix (BM) into the TFT substrate side to improve the allowance in the precision of overlapping greatly has been developed, as shown in JP-A-4-253028, etc.

Further, a technique of applying the technique of taking such CF layer onto active matrix substrate so as to secure an allowance of overlapping between the up and down substrates to the IPS lateral electric field mode has also been proposed (JP-A-11-190856).

Further, a structure of holding a pixel electrode for driving a liquid crystal and a common electrode between the liquid crystal layer and the CF layer to suppress the practical rise in the driving voltage of liquid crystal has been proposed (for example, JP-A-2000-111957).

SUMMARY OF THE INVENTION

However, among the techniques mentioned above, the technique of JP-A-11-190856 has a problem that a driving voltage of liquid crystal is remarkably increased, even though the relaxation of after image can be accelerated and the occurrence of defective display due to after image can be suppressed when CF layer is formed as a part of the upper layer insulating film of a pixel electrode and common electrode.

On the other hand, according to the technique of JP-A-2000-111957, the relaxation time of after image becomes longer even though the rise in driving voltage of liquid crystal can be suppressed, and therefore this technique has a problem in the point of suppression of after image as a displaying characteristic. In cases where CF layer or BM layer is formed on an active matrix substrate, nothing screens the reflected light from pixel electrode or common electrode for driving the liquid crystal in IPS method, so that when the liquid crystal display is viewed from the front side, the contrast ratio decreases due to the reflection from the electrode surfaces.

The object of the present invention is to provide a liquid crystal display of high image quality which can be driven at a low voltage and shows a lowered inhomogeneity of display caused by an after image phenomenon.

In order to solve the problem mentioned above, the liquid crystal display of the present invention comprises one pair of substrates which are a first substrate and a second substrate wherein at least one of the substrates is transparent, a liquid crystal layer and a color filter layer both provided between said one pair of substrates, a plurality of thin film transistors which are provided on the first substrate existing on a downside of the color filter layer and are connected to an image signal wiring and a scanning signal wiring, a common electrode giving a standard potential, and a pixel electrode connected to the thin film transistors and placed opposite to the common electrode in a pixel region, wherein said common electrode and said pixel electrode are placed in different layers from each other through an interlaminar insulating film in the form of layer comprising at least two layers comprising said color filter layer and an orientation direction of liquid crystal molecules of the liquid crystal layer is controlled by a voltage applied through the interlaminar insulating film and between the common electrode and the pixel electrode to make display.

According to the construction mentioned above, the pixel electrode and the common electrode are placed in different layers from each other sandwiching the interlaminar insulating film comprising the color filter layer, and therefore the electric field for driving the liquid crystal molecules through the pixel electrodes and common electrode is given to the liquid crystal layer through intermediation of the interlaminar insulating film. Accordingly, the electric charges which are generated due to polarization, etc. in the liquid crystal layer, interlaminar insulating layer, alignment layer present in the one pair of substrates and the interfaces thereof and accumulated can rapidly be relaxed. Further, since the pixel electrode gives an electric field to the liquid crystal layer through the interlaminar insulating layer more readily than the common electrode, the density of electric field in the edge region of electrodes in which electric field is apt to be concentrated can be relaxed effectively. As its result, after image characteristics can be improved, and a high quality liquid display showing a lowered inhomogeneity of display caused by an after image phenomenon can be realized.

Further, since a part of the interlaminar insulating film existing between the image element electrode and common electrode is replaced with a color filter layer having a relatively large dielectric constant, an effective electric field can be supplied to the liquid crystal layer, so that the driving voltage for driving the liquid crystal can be reduced as compared with the case of using a general organic insulating material.

More concretely speaking, the liquid crystal display comprises one pair of substrates which are a first substrate and a second substrate wherein at least one of the substrate is transparent, and a liquid crystal layer and a color filter layer both provided between said one pair of substrates, wherein said color filter layer is placed close to the first substrate and the liquid crystal layer is placed between the color filter layer and the second substrate, wherein a plurality of scanning signal wirings, a plurality of image signal wirings and a plurality of transistors connected to the image signal wirings and the scanning signal wirings are placed on the first substrate existing on a downside of the color filter layer, each region surrounded by the plurality of scanning signal wirings and the image signal wirings constitutes at least one pixel, and each pixel is provided with a common electrode connected with a common electrode wiring over a plurality of pixels to give a standard potential and a pixel electrode connected to the transistor and placed opposite to the common electrode in a pixel region, wherein said common electrode and said pixel electrode are placed in different layers from each other through an interlaminar insulating film in the form of layer comprising at least two layers comprising said color filter layer and an orientation direction of liquid crystal molecules of the liquid crystal layer is controlled by a voltage applied through the interlaminar insulating film and between the common electrode and the pixel electrode to make display.

In constructing the above-mentioned liquid crystal display, the following elements may be added.

(1) Said common electrode coats at least a part of the image signal wiring and the scanning signal wiring through an insulating film.

(2) Said insulating film is an interlaminar insulating film comprising at least two layers.

(3) At least one layer of said interlaminar insulating film is made of an organic substance.

(4) An insulating overcoat layer is provided in a boundary part between two kinds of color filter layers on the image signal wiring or the scanning signal wiring, and the common electrode is formed on said overcoat layer.

(5) An overcoat layer for protecting the color filter is provided on an upside of the color filter layer, and the common electrode is formed on the overcoat layer.

(6) The common electrode or the common electrode wiring is formed lattice-wise so as to surround the pixel.

(7) An overcoat layer for protecting the color filter is provided on an upside of the color filter layer, and the pixel electrode is formed on the overcoat layer.

(8) Said overcoat layer or said interlaminar insulating film is made of a photosensitive resin.

(9) At least one member selected from the group consisting of the pixel electrode and the common electrode is constituted of a transparent electrode.

(10) Said transparent electrode is constituted of an ion doped titanium oxide film or an ion doped zinc oxide (ZnO) film.

(11) Said common electrode or said common electrode wiring is made of an alloy containing at least one member selected from the group consisting of Al, Cr, Mo, Ta and W.

(12) An antireflection layer is formed on an upside of the common electrode or the common electrode wiring.

(13) As said antireflection layer, a film containing a black-colored pigment is formed.

(14) As said antireflection layer, a phase difference film is laminated.

(15) As said antireflection layer, the common electrode or the common electrode wiring is formed into a laminated structure containing a magnetic material.

(16) The orientation direction of the liquid crystal molecules at two interfaces between the liquid crystal layer and alignment layers formed on said one pair of substrates are roughly in the same direction.

(17) At least one of the alignment layers formed on said one pair of substrates is a photo-reactive material layer. The alignment layers can be formed by irradiating a roughly linearly polarized light to the light-reflecting material layer.

(18) A pre tilt angle of the liquid crystal layer is 5° (5 degrees) or less.

(Explanation of Marks)

| | |
|---|---|
| 101, 102 | Substrates |
| 103 | Common electrode |
| 104 | Scanning signal electrode (gate electrode) |
| 105 | Pixel electrode (source electrode) |
| 106 | Image signal electrode (drain electrode) |
| 107 | Insulating film |
| 108 | Protecting film |
| 109 | Alignment layer |
| 110 | Liquid crystal layer (liquid crystal molecules in the liquid crystal layer) |
| 111 | Color filter layer |

-continued

| 112 | Overcoat layer |
| 113 | Light-shielding part (black matrix) |
| 114 | Polarizing plate |
| 115 | Thin film transistor |
| 116 | Semiconductor film (amorphous silicon) |
| 117 | Electric field |
| 120 | Common electrode wiring |

DETAILED DESCRIPTION OF THE INVENTION

Next, embodiments of the present invention are explained with reference to the drawings attached

The First Embodiment

Figure 1:
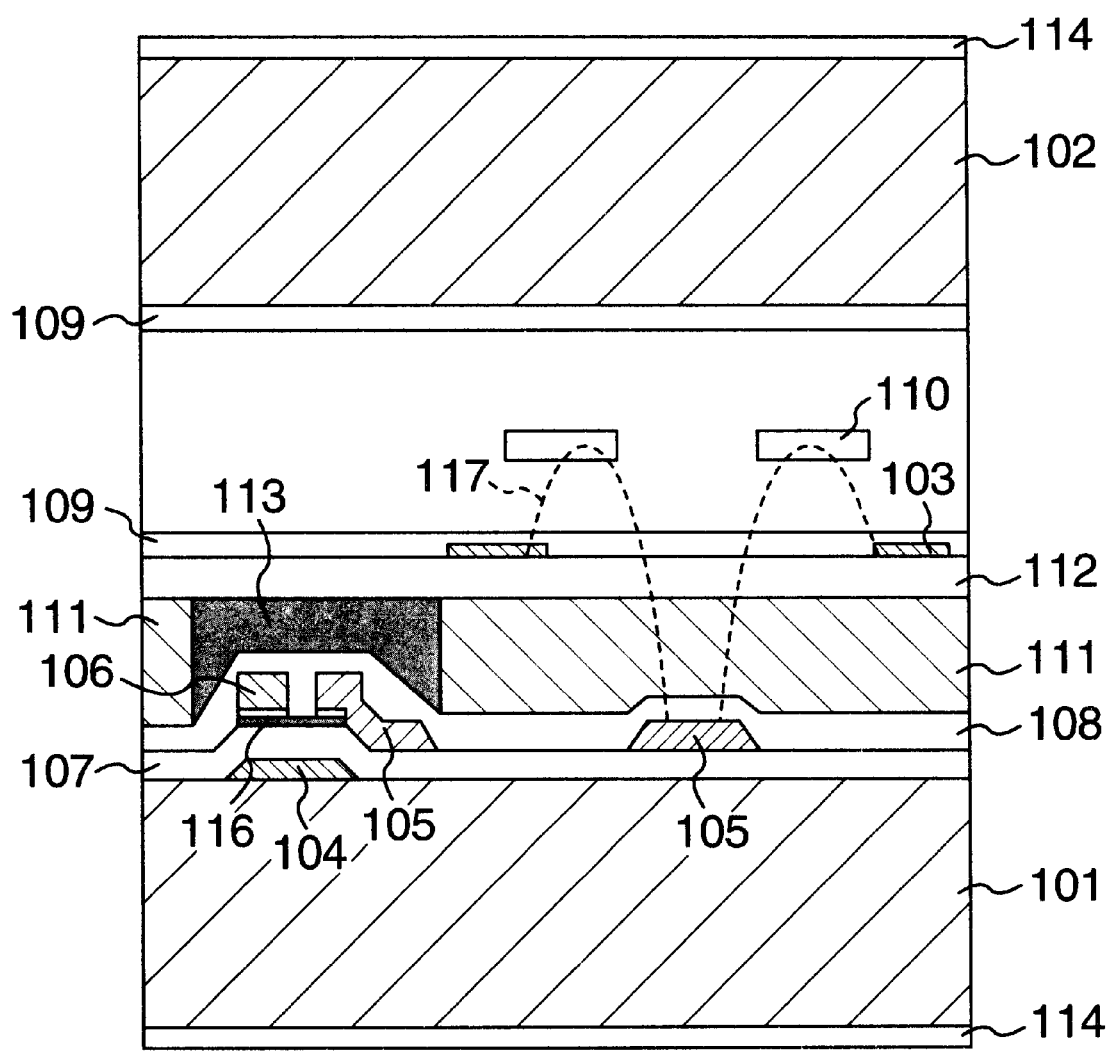
FIG. 1 illustrates a sectional view of main part of a liquid crystal display according to the first embodiment.
Figure 2A:
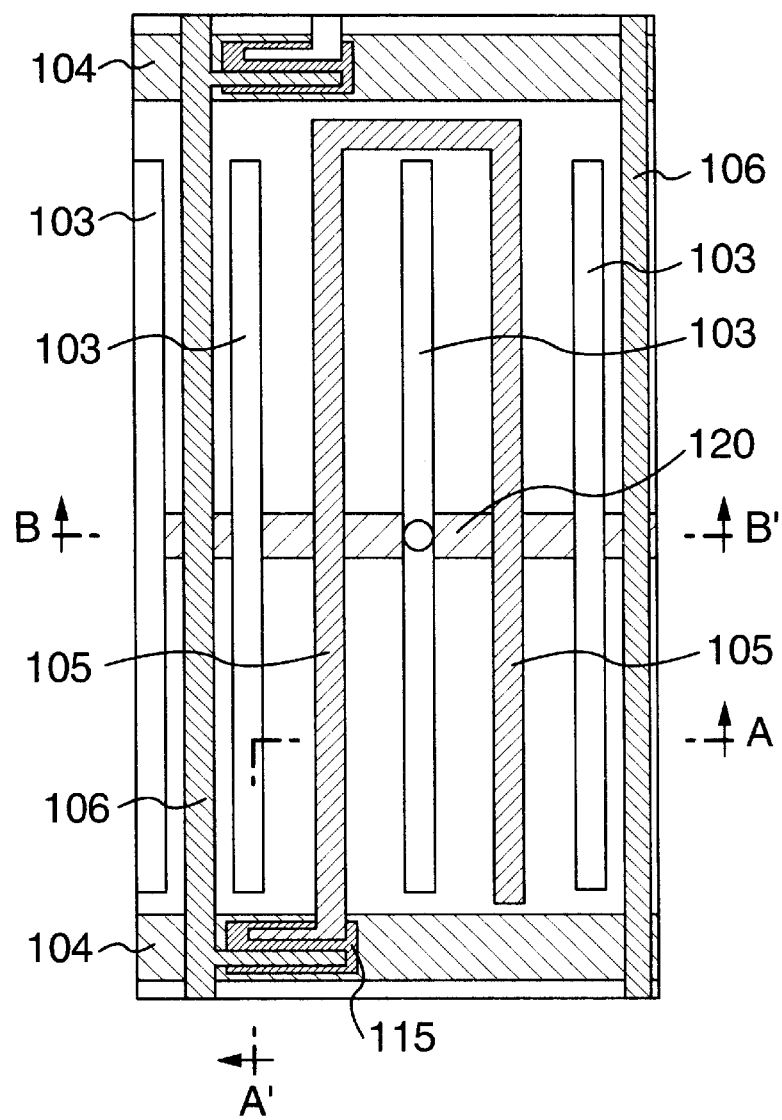
FIG. 2 illustrates a liquid crystal display, wherein 2A is a plan view, 2B is a sectional view of 2A along the line A–A' and 2C is a sectional view of 2A along the line B–B'.
Figure 2B:
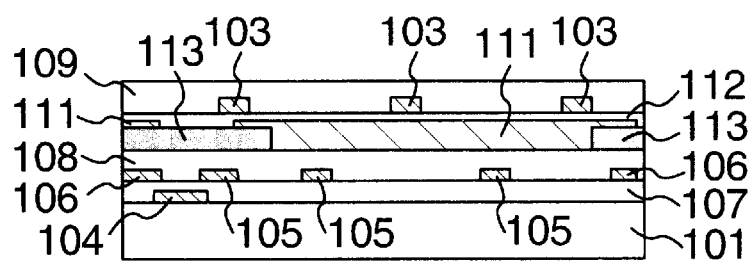
Figure 2C:
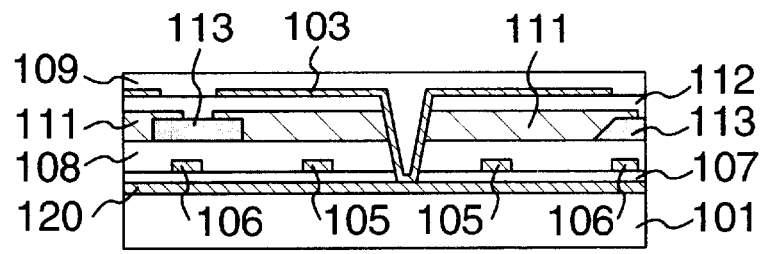

A liquid crystal display according to the first embodiment of the present invention will be explained by referring to FIG. 1 and FIG. 2. FIG. 1 is a sectional view of an active matrix substrate, and FIG. 2A is a plan view thereof. FIG. 2B is a sectional view of 2A along the line A–A', and FIG. 2C is a sectional view of 2A along the line B–B'. FIG. 1 illustrates a part of the section of FIG. 2A along the line A–A'.

In the liquid crystal display according to this embodiment, a gate electrode (scanning signal electrode) 104 made of chromium and a common electrode wiring (common wiring) 120 are placed on a glass substrate 101 (a first substrate), and a gate insulating film 107 made of silicon nitride is formed so as to cover the gate electrode 104 and common electrode wiring 120.

On the gate electrode 104, a semiconductor film 116 made of amorphous silicon is provided through intermediation of gate insulating film 107, and the semiconductor film 116 functions as an active layer of thin film transistor (TFT) which is an active element. Further, a drain electrode made of chromium-molybdenum 106 (image signal wiring) and a source electrode 105 (pixel electrode) are provides so as to overlap with a part of the pattern of semiconductor film 116, and a protecting film 108 made of silicon nitride is formed so as to cover all the above-mentioned materials.

Further, according to this embodiment, a color filter layer 111 is provided on the protecting film 108, which is partitioned into respective pixels by the light-shielding parts 113. Upside of the color filter layer 111 and light-shielding parts 113 is covered by an overcoat layer 112 (interlaminar insulating film) made of a transparent insulating material.

Further, on the overcoat layer 112, a common electrode 103 is formed which is connected to common electrode wiring 120 via a through-hole perforating gate insulating film 107, protecting film 108, light-shielding part 113 and overcoat layer 112. Further, as is apparent from FIG. 2A, a common electrode 103 is formed, which is drawn out from the common electrode wiring 120 so as to be opposite to the pixel electrode 105 in one pixel in the plan view.

Accordingly, in this embodiment, the pixel electrode 105 is so constructed that a common electrode 103 is formed on the overcoat layer 112 which is placed under the under protecting film 108 of color filter layer 111 so as to cover the pixel electrode 105 and color filter layer 111. Each of the regions sandwiched by the plurality of pixel electrodes 105 and common electrode 103 constitutes one pixel. Further, the unit pixels thus constructed are matrix-wise arranged on a substrate to form an active matrix substrate, and an alignment layer 109 is formed on the surface of the active matrix substrate, namely on the overcoat layer 112 having common electrode 103. The surface of the alignment layer 109 is subjected to a rubbing treatment.

On the other hand, an alignment layer 109 is formed on a glass-made counter substrate 102, too, and the surface of this alignment layer 109 is also subjected to a rubbing treatment. A glass substrate 102 (a second substrate) confronting the glass substrate 101 is placed so as to confront the surface of alignment layer 109, and a liquid crystal composition layer 110 is filled into the gap between them. A polarizing plate 114 is formed on each of outside of glass substrate 101 and outside of counter substrate 102.

In the TFT liquid crystal display having the above-mentioned construction, the liquid crystal molecules in the liquid crystal composition layer 110 are aligned roughly in parallel to the surfaces of the confronting substrates 101 and 102, homogeneously toward the initial alignment direction prescribed by the rubbing treatment, when no electric field is applied. When a voltage is applied to the gate electrode 104 to turn on the thin film transistor (TFT), an electric field 117 is applied to the liquid crystal composition 110 due to the potential difference between pixel electrode 105 and common electrode 103, and the liquid crystal molecules change the direction of orientation due to the interaction between the dielectric anisotropy of the liquid crystal composition and the electric field. At this time, light transmittance changes due to the refractive anisotropy of liquid crystal composition layer 110 and the action of polarizing plate 114, and thereby the liquid crystal display can make display.

Next, a method for producing the liquid crystal display of this embodiment will be explained briefly.

First, TFT and electrode pattern are formed on glass substrate 101 by a patterning treatment using the well known photolithographic etching technique.

Subsequently, color filter layer 111 is formed from a resin film containing a red-, green- or blue-colored dye or pigment, for example. Light-shielding part 113 is constructed from a resin film containing a black-colored dye or pigment. It is also possible to form the light-shielding part by the use of a metal. As the method for forming color filter layer 111 and light-shielding part 113, the following methods can be adopted.

(1) Dye-dissolution method: a method of coating a resin solution in which a dye and additives are dissolved and carrying out patterning by the photolithographic etching technique; or a method of forming a pattern from a dyeable polymeric material and then coloring the pattern with an acid dye or a reactive dye.

(2) Printing method: a method of printing a material prepared by adding a powdered pigment to an organic vehicle and an epoxy resin by the method of offset printing or gravure offset printing to make a pattern directly.

(3) Pigment dispersion method: a method of coating a resin containing a pigment as a colorant and making a pattern by the photolithographic etching technique.

(4) Electrostatic painting, micellar electrolytic method: a method of dispersing a dye in the form of micelles, depositing only the dye on an electrode and thereby carrying out patterning.

(5) Color film transfer method: a method of laminating a base film and a photosensitive film consisting of a colored photosensitive resin layer, exposing the laminate to light, peeling off the laminate, and carrying out development to form a pattern.

(6) Ink jet method: a method of projecting a dye or a resin and a dye (pigment) as an ink to form a pattern directly. As a method usable for BM of light-shielding part only, electroless plating method can be referred to.

As the overcoat layer 112, acrylic resin or acrylic epoxy resin excellent in insulating property and transparency or a thermosetting resin such as polyimide resin or the like may be used. Further, a photo curable transparent resin may also be used, and inorganic materials such as polysiloxane resin and the like may also be used. Further, the overcoat layer 112 may function as a liquid crystal alignment layer simultaneously.

As has been mentioned above, according to this embodiment, a color filter layer 111 and an insulating layer are provided between pixel electrode 105 and common electrode 103. This means that the electric field for driving the liquid crystal molecule 110 by means of the pixel electrode 105 and common electrode 103 is given to the liquid crystal layer through the color filter layer 111 and the insulating layer. By adopting such a construction, the residual direct current voltage component governing the after image characteristics of the liquid crystal display, namely the electric charges generated due to polarization and accumulated in the liquid crystal layer, alignment layer, insulating layer and interfaces thereof can be rapidly relaxed. Further, since the pixel electrode 105 more readily gives electric field to liquid crystal layer through the insulating layer 112 and color filter layer 111 than the common electrode 103 does, the extent of density of electric field into the edge region of electrodes where electric field is apt to be concentrated can be relaxed more effectively than in the prior techniques, and thereby the after image characteristics can be improved as has been mentioned above.

Since the insulating layer existing between the pixel electrode 105 and common electrode 103 is partially replaced with color filter layer 111 having a relatively large dielectric constant, an electric field can be supplied to the liquid crystal layer, and the voltage for driving the liquid crystal can be reduced more effectively than in the cases using usual organic insulating materials.

Accordingly, in this embodiment, the allowance in the precision of overlapping of one pair of substrates can be improved greatly, and the productivity can be improved. In addition, the after image characteristics can be improved remarkably, and the voltage for driving the liquid crystal can be reduced.

Further, since the wirings leading to the pixel electrode 105 and common electrode 103 do not cross with color filter layer 111, which leads to shortening of the production process and enhancement of the mass productivity of liquid crystal display.

Second Embodiment

Figure 3:
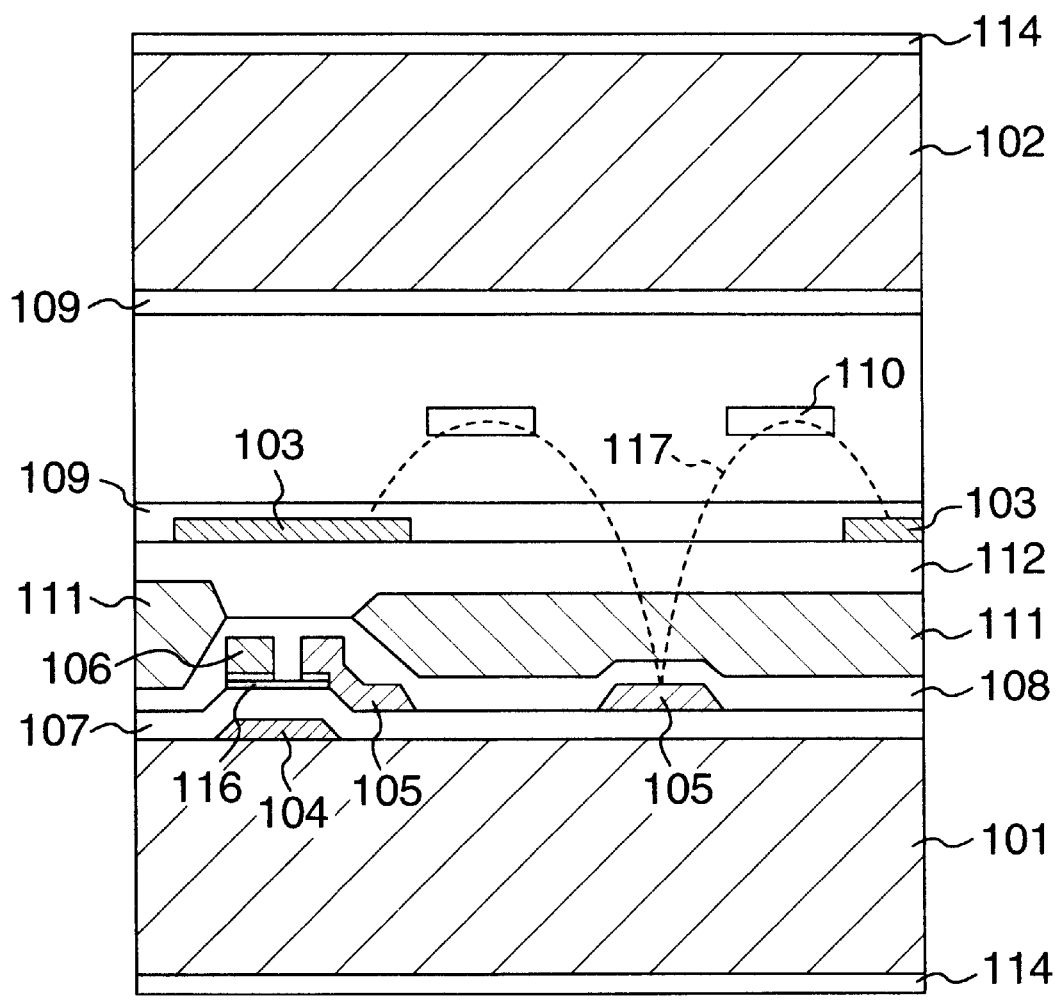
FIG. 3 is a sectional view of main part of a liquid crystal display according to the second embodiment.
Figure 4A:
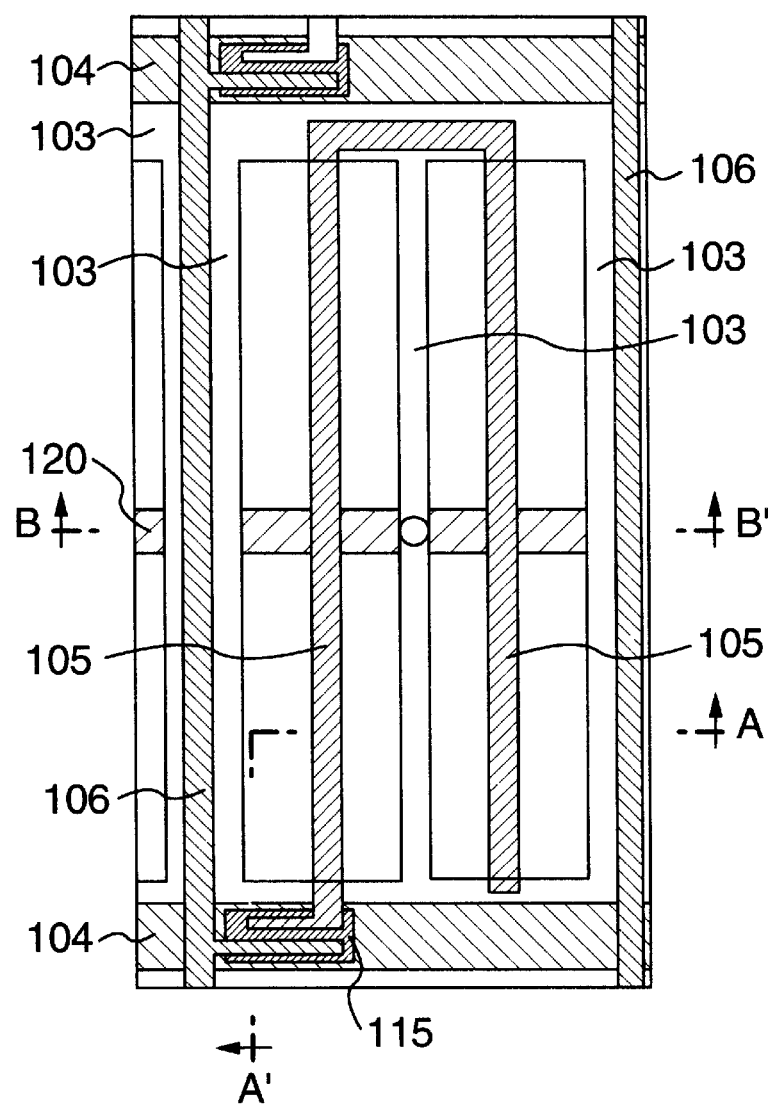
FIG. 4 illustrates a liquid crystal display of FIG. 3, wherein 4A is a plan view, 4B is a sectional view of 4A along the line A–A', and 4C is a sectional view of 4A along the line B–B'.
Figure 4B:
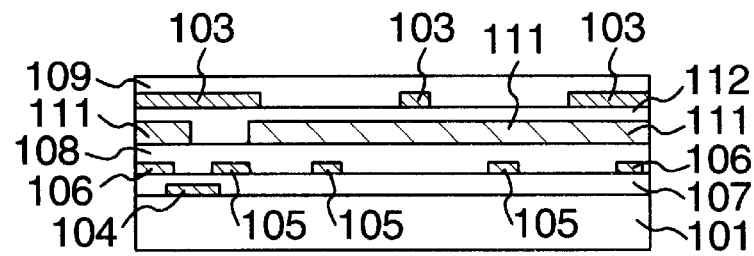
Figure 4C:
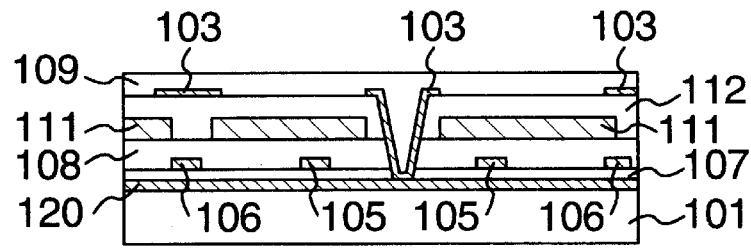

Next, the liquid crystal display of the second embodiment of the present invention will be explained by referring to FIGS. 3, 4 and 5. FIG. 3 is a sectional view of active matrix substrate, and FIG. 4A is a plan view thereof. FIG. 4B is a sectional view of 4A along the line A–A', and FIG. 4C is a sectional view of 4A along the line B–B'. FIG. 3 illustrates a part of the sectional view of 4A along the line A–A'. FIG. 5 is a sectional view of FIG. 4A along the line A–A', of which construction is different from that of FIG. 3.

In the liquid crystal display of this embodiment, a gate electrode 104 made of chromium and a common electrode wiring 120 are provided on the glass substrate 101, and gate insulating film 107 made of silicon nitride is formed so as to cover the gate electrode 104. On the gate electrode 104, semiconductor film 116 made of amorphous silicon is provided through intermediation of gate insulating film 107, and the semiconductor film 116 functions as an active layer of thin film transistor which is an active element.

Further, a drain electrode 106 made of chromium-molybdenum and a source electrode (pixel electrode) 105 are placed so as to overlap with a part of the pattern of semiconductor film 116, and a protecting film 108 made of silicon nitride is formed so as to cover all these materials. On the protecting film 108, color filter layer 111 is provided. The color filter 111 is covered with overcoat layer 112. The overcoat layer 112 is made of a transparent material such as acrylic resin or the like. The pixel electrode 105 is constituted from a transparent electrode such as ITO ($In_2O_3$:Sn) or the like. The common electrode 103 is connected to a common electrode wiring 120 via a through-hole perforating gate insulating film 107, protecting film 108, color filter 111 and overcoat layer 112.

When electric field for driving the liquid crystal is applied, the common electrode 103 making a pair together with pixel electrode 105 is formed so as to envelop one pixel region in a plane. Further, the common electrode 103 is placed on the overcoat layer 112 existing on the color filter layer 111. The common electrode 103 is placed so as to hide the drain electrode 106, scanning signal electrode 104 and TFT (active element) existing in the down layer when viewed from upside, and functions as a light-shielding layer simultaneously. The unit pixels constructed in the above-mentioned manner are arranged matrix-wise to form a active matrix substrate, and on the active matrix substrate, namely on the overcoat layer 112 and the common electrode 103 formed thereon, an alignment layer 109 is formed. The surface of the alignment layer 109 is subjected to a rubbing treatment.

On the other hand, an alignment layer 109 is formed on a counter substrate 102, too, and the surface thereof is also subjected to a rubbing treatment. The glass substrate 101 and the counter substrate 102 are placed in a confronting manner on the surface on which the alignment layer 109 is formed, and liquid crystal composition layer 110 is placed between them. Outside the glass substrate 101 and outside the counter substrate 102, a polarizing plate 114 is formed, respectively.

This embodiment is similar to the first embodiment in that the pixel electrode 105 is placed in the under layer of color filter layer 111 and protecting layer 108, and a common electrode 103 is formed on the overcoat layer 112 covering the pixel electrode 105 and color filter layer 111. When the electric resistance of the common electrode 103 is sufficiently low, the common electrode 103 can function as a common electrode wiring 120 formed in the lowermost layer, simultaneously. In such a case, formation of the common electrode wiring 120 placed in the lowermost layer and fabrication of the therefor necessary through-hole can be omitted.

In this embodiment, as shown in FIG. 4A, each of the regions enveloped by the lattice-wise formed common electrode 103 constitutes one pixel, and each pixel is further divided into four regions by the common electrode 103 and pixel electrode 105.

In the TFT liquid crystal display constructed in the above-mentioned manner, the liquid crystal molecules in the liquid crystal composition layer 110 are aligned roughly in parallel with the surfaces of the confronting substrates 101 and 102 homogeneously toward the initial alignment direction prescribed by the rubbing treatment when no electric field is applied. When a voltage is applied to the gate electrode 104 to turn on the thin film transistor (TFT), electric field 117 is applied to the liquid crystal composition due to the potential difference between pixel electrode 105 and common electrode 103, and the liquid crystal molecules turn its direction to the direction of electric field due to the interaction between the dielectric anisotropy of the liquid crystal composition and the electric field. In this state, the light transmittance is changed by the action of refractive anisotropy of liquid crystal composition layer and polarizing plate 114, and thereby the liquid crystal display can make a display.

Figure 5A:
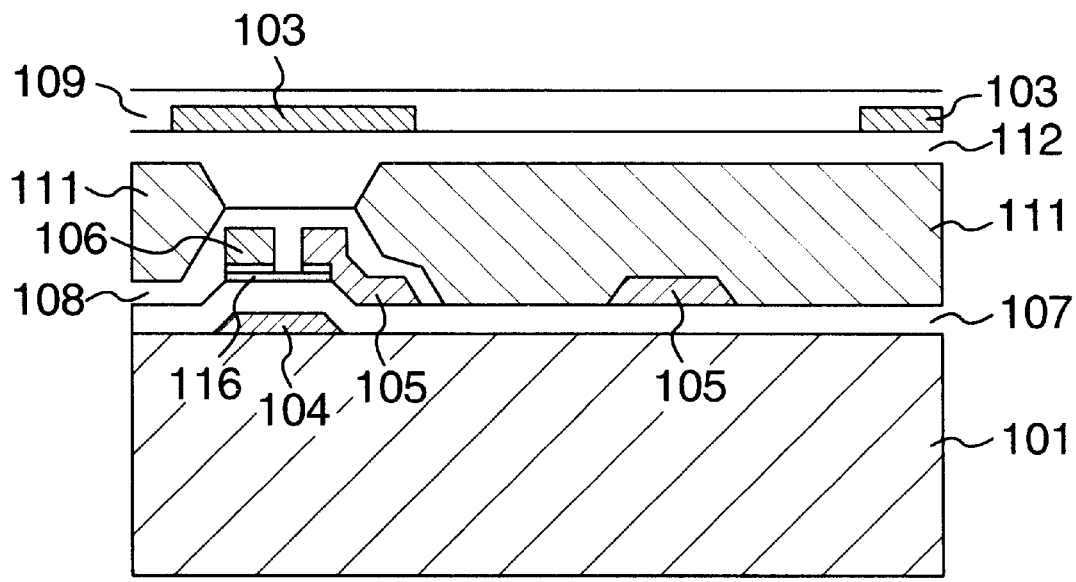
FIG. 5 is a sectional view of FIG. 4A along the line A–A', of which construction is different from that of FIG. 3.

Further, according to this embodiment, the driving voltage of liquid crystal can be reduced by peeling off the protecting film 108 present on the pixel electrode 105 by an etching treatment and forming thereon a color filter layer 110, as shown in FIG. 5A.

Figure 5B:
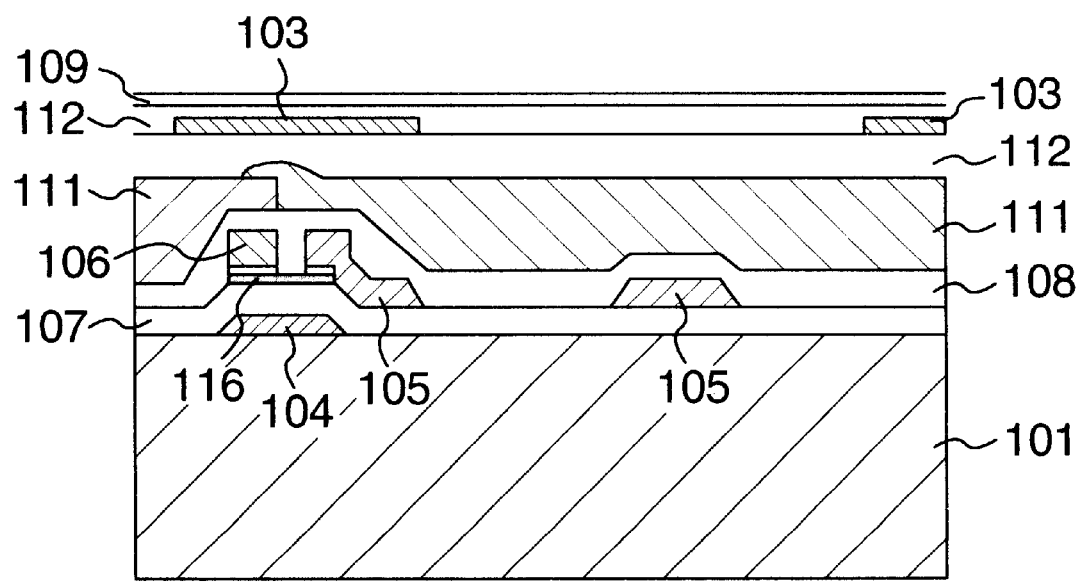

Further, according to this embodiment, formation of BM is unnecessary because the common electrode 103 simultaneously functions as a light-shielding layer. In such a case, color filter layers are formed while leaving a gap between them as shown in FIG. 4 and FIG. 5A so that the color filters make no overlapping, in order to prevent mixing of colors between color filter layers of adjacent pixels. Thereafter, the surface is made even by the overcoat layer 112 formed thereon, and thereby the common electrode 103 formed thereafter on the boundary region can be made into an even and uniform electrode pattern having no irregularity, and the effect as a light-shielding layer can be secured more certainly. In a case where color filter layers of adjacent pixels overlap with one another without mixing of colors as shown in FIG. 5B, the boundary region can be made flat and even by forming an overcoat layer 112 thereon, and the common electrode 103 formed thereon can be made into a uniform electrode pattern having no irregularity and the effect as a light-shielding layer can be secured.

In a case where the common electrode 103 is constructed from a metallic electrode in this embodiment, a reflection of outer light from the metallic surface takes place, which can cause a decrease of contrast ratio as a liquid crystal display. In such a case, such a phenomenon can be prevented by forming a antireflection layer on the common electrode 103, namely by (I) forming a black pigment-containing film such a light-shielding layer or (II) laminating a phase difference film or (III) making the common electrode into a laminate structure containing a magnetic material.

As has been mentioned above, this embodiment is similar to the first embodiment in that a color filter layer 111 and an insulating layer are provided between pixel electrode 105 and common electrode 103. Accordingly, the electric field for driving the liquid crystal molecules 110 by the action of pixel electrode 105 and common electrode 103 is given to the liquid crystal layer via the color filter layer 111 and the insulating layer. By adopting such a construction, the residual direct current (DC) voltage components governing the after image characteristics of the liquid crystal display, namely the electric charges due to polarization, etc. generated and accumulated in the liquid crystal layer, alignment layer, insulating layer and interfaces thereof can rapidly be relaxed. Further, since the pixel electrode 105 more readily gives an electric field to the liquid crystal layer via insulating layer 112 and color filter 111 than the common electrode 103, the extent of density of electric field into the edge regions of the electrode into which the electric field is apt to be concentrated can be relaxed more effectively than in the prior cases, and the after image characteristics can be improved as above.

Further, since a part of the insulating layer existing between the pixel electrode 105 and common electrode 103 is replaced with color filter layer 111 having a relatively large dielectric constant, electric field can be supplied to the liquid crystal layer more effectively than in the case of using a usual organic insulating material, and the driving voltage of the liquid crystal can be reduced.

Accordingly, in this embodiment, the allowance in the precision of overlapping of the one pair of substrates is greatly improved and the productivity is improved, and in addition, the after image characteristics can be improved remarkably and the driving voltage of liquid crystal can be reduced. Further, in this embodiment, the common electrode wiring 120 simultaneously functions as a light-shielding layer, and therefore the process for producing the color filter layer can be simplified.

In the first and second embodiments mentioned above, a plurality of display regions each constituted from a common electrode and a pixel electrode can be provided in one pixel. By providing a plurality of display regions, the distance between the pixel electrode and the common electrode can be shortened even when each pixel is large, which makes it possible to decrease the voltage to be input for driving the liquid crystal.

Third Embodiment

Figure 6:
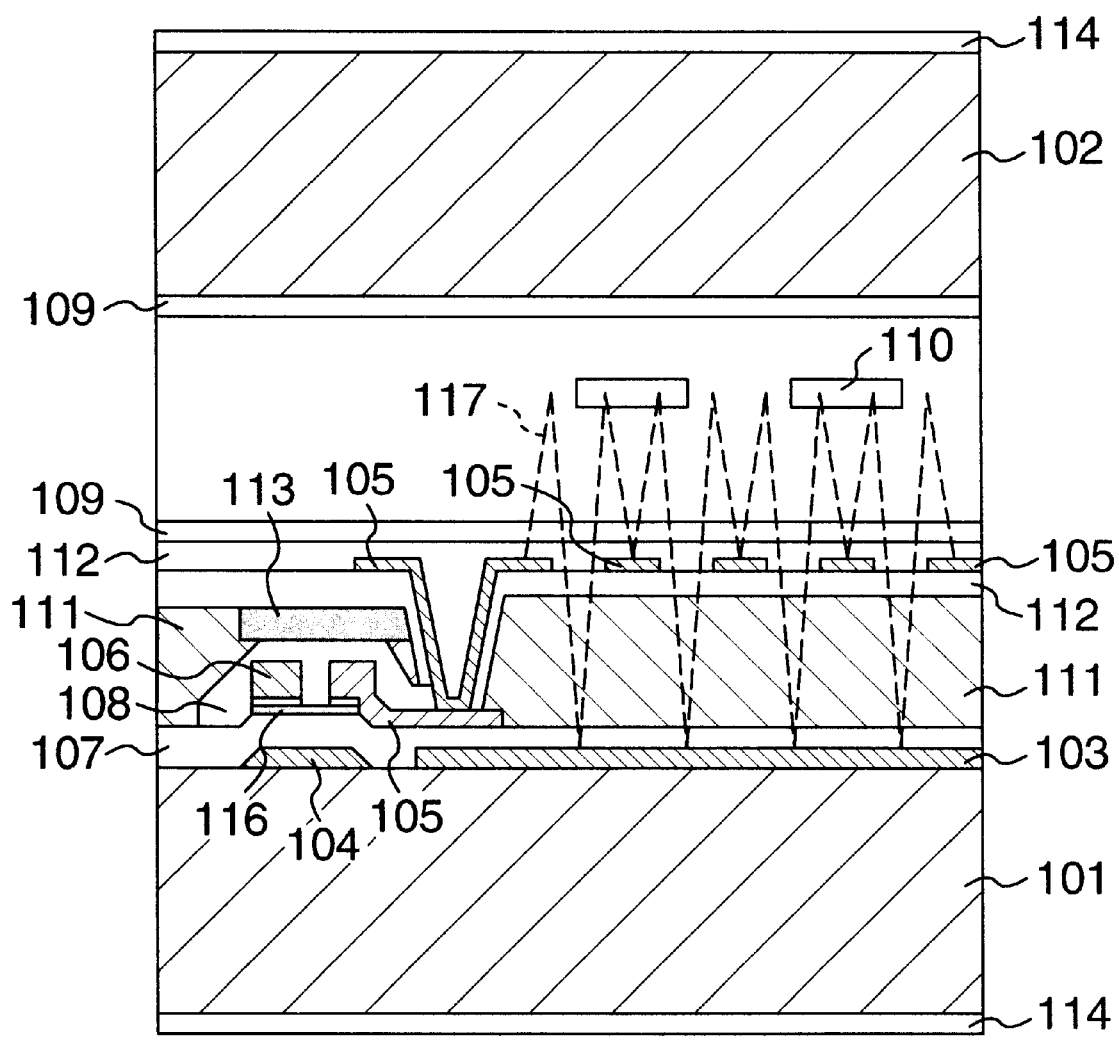
FIG. 6 is a sectional view of main part of a liquid display according to the third embodiment.
Figure 7A:
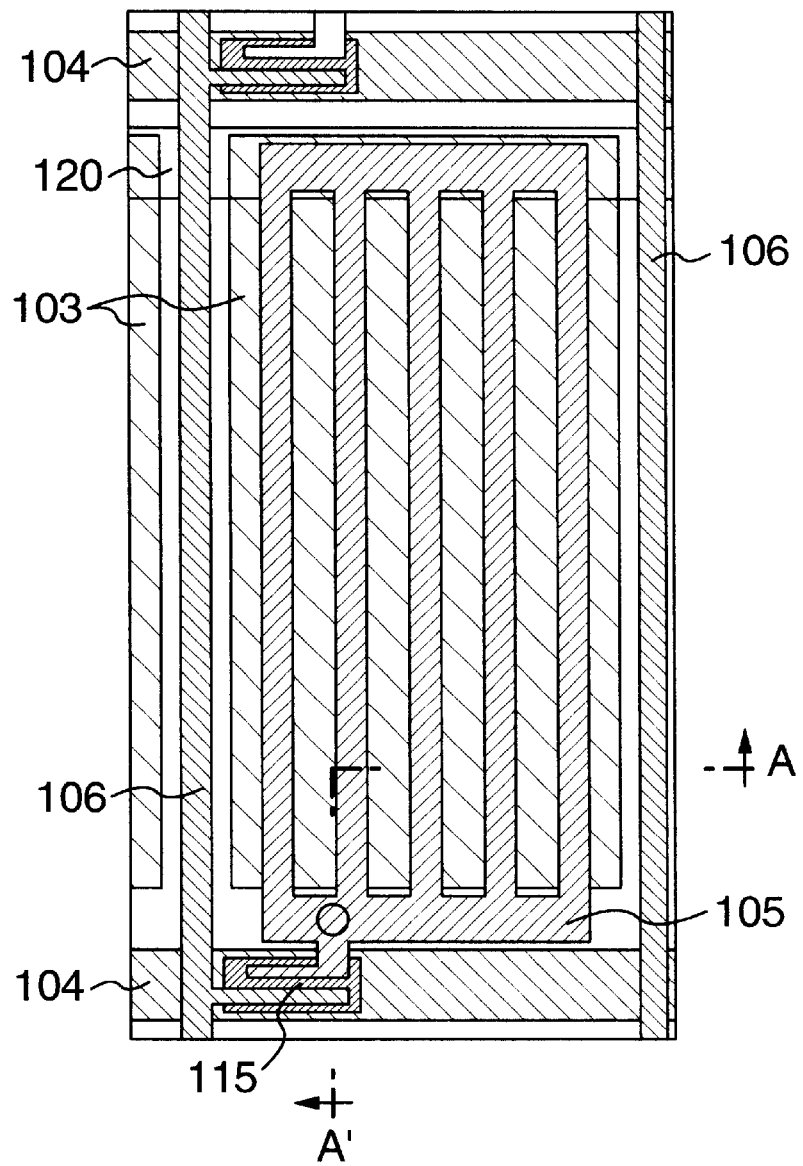
FIG. 7 illustrates a liquid crystal display of FIG. 6, wherein 7A is a plan view and 7B is a sectional view of 7A along the line A–A'.
Figure 7B:
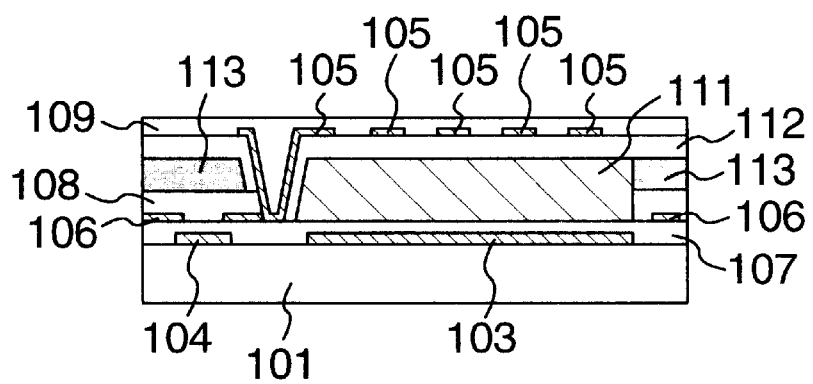

Next, a liquid crystal display of the third embodiment will be explained by referring to FIGS. 6, 7 and 8. FIG. 6 is a sectional view of an active matrix substrate, and FIG. 7A is a plan view thereof. FIG. 7B is a sectional view of 7A along the line A–A'. FIG. 6 illustrates a part of the section of FIG. 7A along the line A–A', wherein the section shows a layer construction different from that of FIG. 7B. FIG. 8 illustrates a section of FIG. 7A along the line A–A', of which construction is different from that of FIG. 6.

In the liquid crystal display of this embodiment, a gate electrode (scanning signal electrode) 104 made of chromium and a common electrode wiring 120 are provided on the glass substrate 101, and a planar common electrode 103 consisting of a transparent electrode is formed on the common electrode wiring 120, and a gate insulating film 107 made of silicon nitride is formed so as to cover the gate electrode 104, common electrode wiring 120 and common electrode 103.

Further, a semiconductor film 116 made of amorphous silicon is provided on the gate electrode 104 through intermediation of the gate insulating film 107, and the semiconductor film 116 functions as an active layer of the thin layer transistor (TFT). Further, a drain electrode 106 made of chromium-molybdenum and a source electrode (pixel electrode) 105 are provided so as to overlap with a part of the pattern of semiconductor film 116, and a protecting film 108 made of silicon nitride is formed into a pattern so as to cover the drain electrode 106, source electrode 105 an TFT part.

According to this embodiment, color filter 111 is divided into parts by light-shielding part 113 and placed on protecting film 108. The color filter 111 and light-shielding part 113 are covered with an overcoat layer (interlaminar insulating film) 112 made of a transparent material.

A pixel electrode 105 consisting of a transparent electrode is provided on the overcoat layer 112, and the pixel electrode 105 is connected to source electrode 105 via a through-hole perforating gate-insulating film 107, protecting film 108, color filter layer 111 and overcoat layer 112. When viewed in a plane, a common electrode 103 made of a transparent electrode is formed in the lowermost layer so as to confront the pixel electrode 105 in one pixel, as shown in FIG. 7A.

Accordingly, in this embodiment, the pixel electrode 105 and common electrode 103 can form an addition capacity by overlapping one electrode with another electrode in the whole area of an aperture part of the pixel while securing an insulating property by sandwiching the color filter layer 111 and the insulating film and thereby utilize the addition capacity of the overlapping part as a retaining capacity without decreasing the area of the aperture part of pixel.

Further, an alignment layer 109 is formed on the surface of active matrix substrate in which unit pixels constructed as above are arranged in matrix-wise, namely on the overcoat layer 112 and the thereon formed pixel electrode 105, and a surface of the alignment layer 109 is subjected to a rubbing treatment.

On the other hand, an alignment layer 109 is formed also on the glass-made counter substrate 102, and the surface thereof is also subjected to a rubbing treatment. A glass substrate 101 and a counter substrate 102 are placed in a confronting manner on the alignment layer-forming surface, and a liquid crystal composition layer 110 is provided between 101 and 102. Further, a polarizing plate 114 is formed both outside the glass substrate 101 and outside the counter substrate 102.

In the TFT liquid crystal display having the above-mentioned construction, the liquid crystal molecules in the liquid crystal composition layer 110 are aligned in a roughly parallel direction to the confronting substrates 101 and 102 when no electric field is applied, and homogeneously aligned toward the initial alignment direction prescribed by the rubbing treatment. When a voltage is applied to the gate electrode 104 and the thin film transistor (TFT) is turned on, electric field 117 is applied to the liquid crystal composition layer due to the potential difference between pixel electrode 105 and common electrode 103, and the direction of liquid crystal molecules 110 is changed to the direction of electric field by the interaction between the dielectric anisotropy of liquid crystal composition and electric field. At this time, the light transmission changes due to the actions of refractive anisotropy of liquid crystal composition layer and polarizing plate 114, and thereby this liquid crystal display can make display.

Figure 8A:
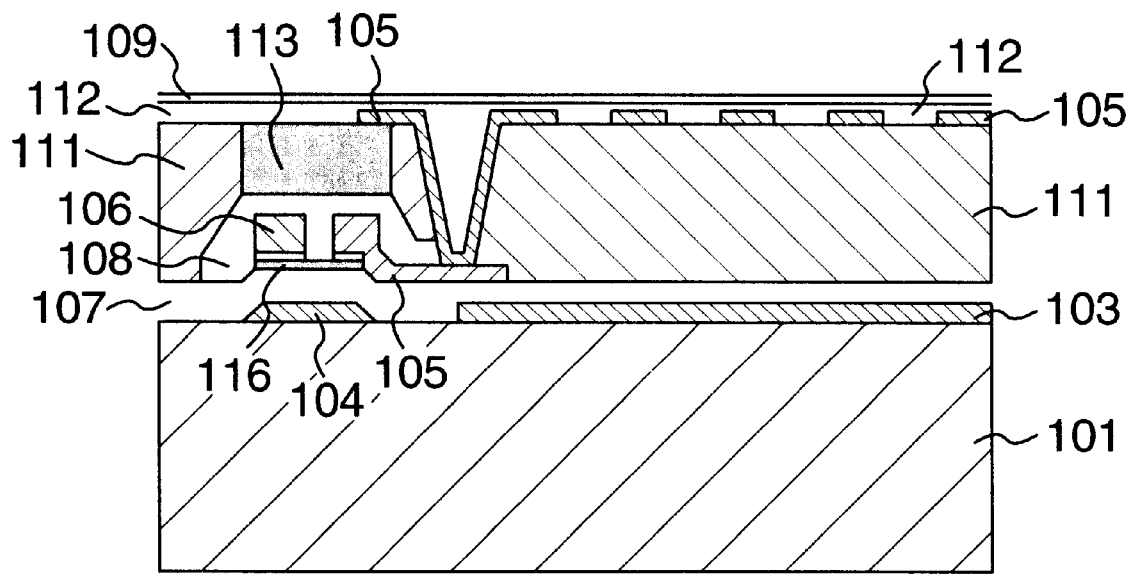
FIG. 8 is a sectional view of FIG. 7A along the line A–A', of which construction is different from that of FIG. 6.

Further, according to this embodiment, it is also possible to make the surface of active matrix substrate even and flat, and thereby to facilitate the rubbing treatment of alignment layer 109, by forming the pixel electrode 105 directly on the color filter layer 111 and forming an overcoat layer 112 thereover as shown in FIG. 8A.

Figure 8B:
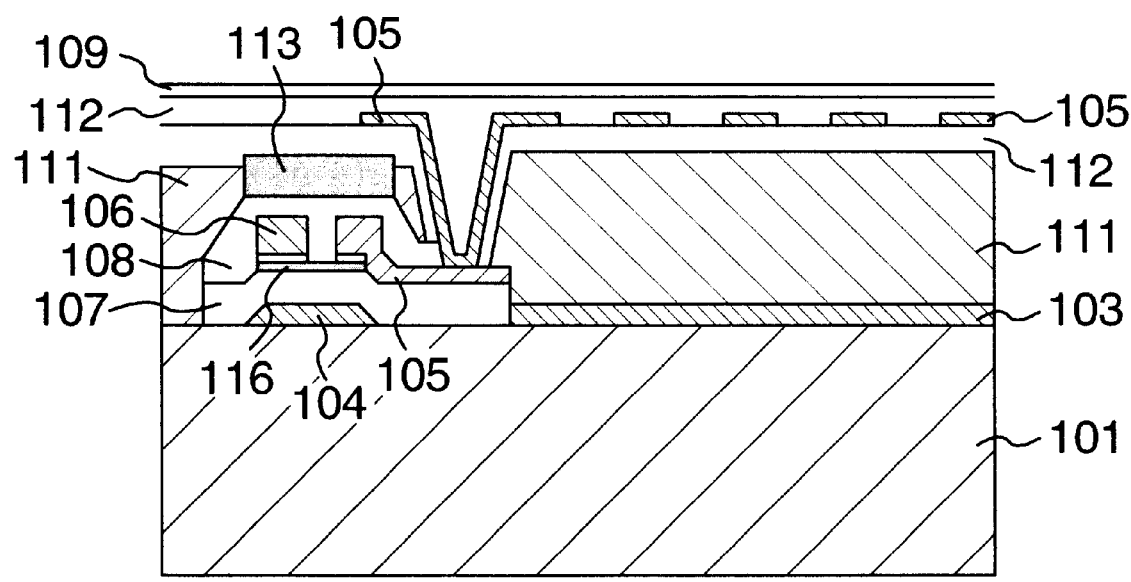

Further, it is also possible to peel off the gate insulating film 104 formed on the common electrode 103 selectively by an etching treatment and to form a color filter layer 111 thereon as shown in FIG. 8B. At this time, the electrostatic painting method or micellar electrolytic method among the above-mentioned methods for forming color filter layer and light-shielding layer can be utilized and thereby the production process of color filter layer can be simplified.

Further, by adopting the construction shown in FIG. 8A and 8B, the driving voltage of liquid crystal can be reduced.

As above, this embodiment is similar to the first and second embodiments in that color filter layer 111 and insulating layer are provided between pixel electrode 105 and common electrode 103. This means that the electric field for driving the liquid crystal molecules 110 by the action of pixel electrode 105 and common electrode 103 is given to the liquid crystal layer via color filter layer 111 and insu-lating layer. By adopting such a construction, the residual direct current voltage component governing the after image characteristics of the liquid crystal display can be relaxed rapidly. Further, since the pixel electrode 105 more readily gives an electric field to the liquid crystal layer via the insulating layer 112 and color filter layer 111 than the common electrode 103 does, the extent of density of electric field in the edge region of electrode into which electric field is apt to be concentrated can effectively be relaxed than in the case of prior techniques, and thereby the after image characteristics can be improved.

Further, since the insulating layer existing between the pixel electrode and the common electrode is partially replaced with a color filter layer having a relatively large dielectric constant, a more effective electric field can be given to the liquid crystal layer than in the case of using a usual insulating organic material, and thereby the voltage for driving the liquid crystal can be reduced.

Accordingly, in this embodiment, the allowance in the precision of overlapping of the pair of electrodes is greatly improved and the productivity can be improved, and in addition, the after image characteristics can be improved remarkably, and further the voltage for driving the liquid crystal can be reduced.

In the liquid crystal displays of the above-mentioned first to third embodiments, the material of the transparent electrically conductive film constructing at least one of the pixel electrode and common electrode is not particularly limited. Preferably, however, it is preferable to use a transparent electrically conductive film prepared by ion doping titanium oxide such as indium-tin-oxide (ITO) or the like or an ion doped zinc oxide film, from the viewpoint of easiness of fabrication and highness of reliability.

It is also possible to use a photo-reactive alignment layer subjected to a polarizing light-irradiation treatment which can cause a photochemical reaction selectively, in place of the above-mentioned polyimide type alignment layer of which alignment is to be controlled by a rubbing treatment.

It is generally known that the photoreactive alignment layer is a means for controlling alignment by which a strong surface anchoring strength in the azimuthal direction and a sufficient (higher than several degrees) interfacial tilt angle cannot be given easily. However, the IPS method is different from the prior vertical electric field method typified by the conventional TN method in that no interfacial tilt is necessary theoretically, and the view angle characteristic thereof is better at a smaller interfacial tilt angle. In the above-mentioned photoreactive alignment layer, an extreme smallness of interfacial tilt angle is preferable contrariwise, because a good view angle characteristic can be expected.

EXAMPLES

Next, examples of the present invention will be mentioned below.

Example 1

An example of the above-mentioned first embodiment will be mentioned below by referring to FIGS. 1 and 2. In this example, glass substrates having a thickness of 0.7 mm and having a polished surface were used as the substrates 101 and 102 for production of liquid crystal display.

Thin film transistor 115 was constructed from pixel electrode 105, signal electrode 106, scanning electrode 104 and amorphous silicon 116. The scanning electrode 104, common electrode 120, signal electrode 106 and pixel electrode 105 were all formed by patterning of a chromium film, and the gap between the pixel electrode 105 and common electrode 103 was adjusted to 7 μm. Although a chromium film which can be patterned easily was used for the common electrode 103 and pixel electrode 105 in this example, it is also possible to prepare transparent electrodes from ITO film for the purpose of achieving a higher luminance characteristic. The gate insulating film 107 and protective insulating film 108 were made of silicon nitride, and film thickness thereof was both 0.3 μM.

A color filter layer 111 was formed thereon, which was formed into the prescribed pattern by a pigment-dispersion method, namely by coating a pigment-dispersed resists prepared by dispersing one of the R, G and B colored pigments into a negative photosensitive acrylic resin, exposing the resist to light through a photomask, developing it and thereafter post-baking it (this procedure was repeated three times, namely for the R, G and B pigments). Thereafter, a lattice-form black matrix 113 was prepared in the same manner as above, namely by carrying out exposure and development by the use of a positive resist prepared from a polyimide resin containing a carbon black type black pigment and a positive resist used for patterning thereof.

Then, an acrylic resin was coated thereon, and a heat treatment was carried out at 220° C. for one hour to form a transparent and insulating overcoat layer 112.

Subsequently, a through-hole reaching common electrode wiring 120 was formed by a photolithographic etching treatment as shown in FIG. 2C, and common electrode 103 connecting to the common electrode wiring 120 was formed by patterning.

As its result, there was formed a construction that pixel electrode 105 was provided between three common electrodes 103 in one unit pixel, as shown in FIG. 2A, and there was formed an active matrix substrate in which the number of pixels was 1,024×3×768 constituted of 1,024×3 (corresponding to R, G and B) signal electrodes 106 and 768 scanning electrodes 104.

Subsequently, an alignment layer was formed on the active matrix substrate by printing a polyamic acid varnish constituted of p-phenylene-diamine and 3,3', 4,4'-biphenyltetracarboxylic acid dianhydride and heat-treated at 220° C. for 30 minutes to form a polyimide alignment layer 109 having a density of about 80 nm.

In the same manner as above, an alignment layer was formed by printing a polyamic acid varnish on the surface of another glass substrate 102 of which back side has already been coated with a film of ITO, and heat-treated at 220° C. for 30 minutes to form a polyimide alignment layer 109 having a thickness of about 80 nm. Subsequently, the surface of the alignment layer was subjected to a rubbing treatment with a buff cloth attached to a rubbing roller to give a liquid crystal alignment performance to the film.

In this example, rubbing was adopted as the method for giving an alignment performance. However, other methods such as a method of coating an ultraviolet-curable resin solution to form an alignment layer and irradiating it with a polarized ultraviolet light to cause a photochemical reaction and thereby giving a liquid crystal-alignment performance, or a method of spreading an organic molecular film on a water surface, drawing up the film to form an highly aligned multi-layer film and using it as an alignment layer, can also be used.

Especially, the latter two methods have hitherto been regarded as alignment methods incapable of giving a sufficiently large interfacial tilt angle. However, by combining these methods with IPS method, the practicability such as mass productivity, etc. can be improved, because IPS method requires no interfacial tilt angle theoretically unlike the vertical electric field method of which typical example is the prior TN method.

Subsequently, a cell was assembled by placing these two substrates so that their surfaces having a liquid crystal-alignment performance confronted each other through intermediation of a spacer made of dispersed globular polymer beads, and coating a sealing agent on the peripheral parts. The directions of rubbing of the two substrates were nearly parallel to each other, and the angle which they made with the direction of input electric field was adjusted to 75°. Into the cell was injected a nematic liquid crystal composition A in vacuum, wherein dielectric anisotropy $\Delta\epsilon$ was positive and had a value of 10.2 (1 kHz, 20° C.), the refractive anisotropy thereof $\Delta n$ was 0.075 (wavelength 590 nm, 20° C.), the twist elastic constant K2 was 7.9 pN, and nematic-isotropic phase transition temperature (N-I) was about 76° C, and then it was sealed with a sealant composed of an ultraviolet (UV light) curable resin. A liquid crystal panel having a liquid crystal layer thickness (gap) of 4.2 μm was prepared. Retardation ($\Delta nd$) of this panel was about 0.31 μm. Further, a homogeneously aligned cell was prepared by using the same alignment layer and liquid crystal composition as those used in this panel, and the pre-tilt angle of the liquid crystal was measured by the crystal rotation method. As a result, the pre-tilt angle was about 2°. This panel was put between two polarizing plates 114, wherein the polarized light transmitting axis of one polarizing plate was made approximately parallel to the above-mentioned rubbing direction, and that of the other was made to cross therewith rectangularly. Then, a driving circuit, a back light, etc. were connected to form a module, whereby an active matrix liquid crystal display was obtained. In this example, the normally black mode was adopted, namely a dark image was given at a low voltage and a bright image was given at a high voltage.

Subsequently, the display quality of the liquid crystal display of this example was evaluated. As a result, a high display quality was confirmed, and a wide viewing angle characteristic was confirmed.

Subsequently, the image-sticking performance and relaxation behavior of after image of the liquid crystal display of this example were quantitatively measured by means of an oscilloscope combined with a photo-diode. First, a window pattern was displayed on the picture for 30 minutes at the maximum luminance, after which the whole picture was changed over to a gray scale image where the luminance was 10% of the maximum luminance and the after image was most conspicuous, and the period of time necessary for disappearance of the pattern in the edge part of window was evaluated as an after image relaxation time, provided that the after image relaxation time allowable in this test was at most 5 minutes.

As a result, the relaxation time of after image was one minute or less. In a visual examination of image quality and after image, neither irregular sticking of image nor irregular display due to after image was observed at all, demonstrating that the display characteristic was high. The driving voltage of liquid crystal giving the maximum luminance was about 6.6 V.

Example 2

An example of the above-mentioned second embodiment will be explained by referring to FIGS. 3 and 4. The substrates 101 and 102 used in this example for production of liquid crystal display were glass substrates having a polished surface and having a thickness of 0.7 mm.

The thin film transistor 115 was constituted of pixel electrode 105, signal electrode 106, scanning electrode 104 and amorphous silicon 116. The scanning electrode 104 was formed by patterning an aluminum film; the common electrode wiring 120 and signal electrode 106 were formed by patterning a chromium film; and the pixel electrode 105 was formed by patterning an ITO film. The gate insulating film 107 and protective insulating film 108 were both made of silicon nitride, and both had a film thickness of 0.3 μm.

The color filter layer existing thereon was formed into the prescribed pattern according to the pigment dispersion method by coating a pigment dispersion resist (the resists were prepared by dispersing each of R, G and B-colored pigments in a negative photosensitive acrylic resin), and exposing them through a photo-mask, followed by development and post-baking (these procedures were repeated three times, namely for R, G and B pigments).

Subsequently, a cylindrical through-hole having a diameter of about 10 μm and reaching the common electrode wiring 120 was formed as shown in FIG. 4C by photolithographic etching treatment, an acrylic resin was coated thereon, and a heat-treatment was carried out at 220° C. for one hour to form a transparent and insulating overcoat layer 112 having a dielectric constant of about 4 up to a thickness of about 1 μm. Due to the presence of this overcoat film 112, the unevenness in the display region due to the level difference in the pixel electrode 105 and the unevenness in the boundary region of color filter layer 111 between the adjacent pixels could be made even.

Subsequently, the through-hole part was again etched to adjust the diameter to about 7 μm, and a common electrode 103 connecting to the common electrode wiring 120 was formed thereon by patterning an ITO film. At this time, the gap between the pixel electrode 105 and the common electrode 103 was adjusted to 7 μm. The common electrode 103 was lattice-wise formed so as to cover the upside of image signal wiring 106, scanning signal wiring 104 and thin film transistor 115, so that it simultaneously functioned as a light-shielding layer.

As its result, a unit pixel came to be so constructed that pixel electrode 105 was provided between three common electrodes 103 as shown in FIG. 4A. In the active matrix substrate thus formed, the number of pixels was 1,024×3× 768 constituted of 1,024×3 (corresponding to R, G and B) signal electrodes 106 and 768 scanning electrodes 104.

Subsequently, the an alignment layer 109 is formed and its alignment direction was treated in the same manner as in Example 1.

In this example, too, rubbing method was used for giving an alignment performance. However, other methods such as a method of coating an ultraviolet-curable resin solution to form an alignment layer and irradiating it with a polarized ultraviolet light to cause a photochemical reaction and thereby giving a liquid crystal-alignment performance, or a method of spreading an organic molecular film on a water surface, drawing up the film to form an highly aligned multi-layer film and using it as an alignment layer, can also be used. Especially, the latter two methods have hitherto been regarded as alignment-controlling methods incapable of giving a sufficiently large interfacial tilt angle. However, by combining these methods with IPS method, the practicability such as mass productivity, etc. can be improved, because IPS method requires no interfacial tilt angle theoretically unlike the vertical electric field method of which typical example is the prior TN method.

Subsequently, a cell was assembled by placing these two substrates so that their surfaces having a liquid crystal-alignment performance confronted each other through intermediation of a spacer made of dispersed globular polymer beads, and coating a sealant on the peripheral parts. The directions of rubbing of the two substrates were nearly parallel to each other, and the angle which they made with the direction of input electric field was adjusted to 75°. Into the cell was injected a nematic liquid crystal composition A in vacuum, wherein dielectric anisotropy $\Delta\epsilon$ was positive and had a value of 10.2 (1 kHz, 20° C.), the refractive anisotropy thereof $\Delta n$ was 0.075 (wavelength 590 nm, 20° C.), the twist elastic constant K2 was 7.0 pN, and nematic-isotropic phase transition temperature (N-I) was about 76° C., and then it was sealed with a sealant composed of an ultraviolet-curable resin. A liquid crystal panel having a liquid crystal layer thickness (gap) of 4.2 μm was prepared. Retardation ($\Delta nd$) of this panel was about 0.31 μm. Further, a homogeneously aligned cell was prepared by using the same alignment layer and liquid crystal composition as used in this panel, and the pre tilt angle of the liquid crystal was measured by the crystal rotation method. As a result, the pre-tilt angle was about 2°. This panel was put between two polarizing plates 114, wherein the polarized light transmitting axis of one polarizing plate was made approximately parallel to the above-mentioned rubbing direction, and that of the other was made to cross therewith rectangularly. Then, a driving circuit, a back light, etc. were connected to form a module, whereby a an active matrix liquid crystal display was obtained. In this example, the normally black mode was adopted, namely a dark image was given at a low voltage and a bright image was given at a high voltage.

Subsequently, display quality of the liquid crystal display of this example was evaluate. As a result, it was confirmed that the display of this example was higher than the liquid crystal display of Example 1 in aperture ratio, high in the quality of display, and wide in viewing angle characteristic.

Further, in the same manner as in Example 1, image-sticking characteristic and relaxation time of after image were quantitatively measured and evaluated. As a result, the relaxation time of after image was not longer than one minute. In a visual examination of image quality and after image, no inhomogeneity of display due to after image and sticking of image was observed at all, demonstrating that the display characteristic was high. The driving voltage of liquid crystal was about 7 V, which was comparable to that of Example 1.

Example 3

Next, Example 3 will be explained. In this example, the material of common electrode 103 was altered from ITO film to chromium film, and the number of through-holes for connecting the common electrode wiring 120 to common electrode 103 which was one per each image element in the foregoing examples was altered to one for each RGB pixel, and the rate of formation of through-hole was reduced to ⅓. The other conditions were the same as in Example 2. Under such conditions, a liquid crystal display was prepared, and quality of display was evaluated. As a result, it was confirmed that the quality of display was so high as comparable to that of the liquid crystal display of Example 2. Wide viewing angle characteristic was also confirmed.

Further, in the same manner as in Example 1, image-sticking characteristic and relaxation time of after image were quantitatively measured and evaluated. As a result, the relaxation time of after image was not longer than one minute, similarly to Example 2. In a visual examination of image quality and after image, no inhomogeneity of display due to after image and sticking of image was observed at all, demonstrating that the display characteristic was high. The driving voltage of liquid crystal was about 6.5 V, which was comparable to that of Example 1.

Example 4

Next, Example 4 will be explained. In this example, a liquid crystal display was prepared by repeating the procedure of Example 2, except that the material constituting common electrode 103 was altered from ITO film to a chromium film like in Example 3, and after patterning the common electrode 103, a phase difference film was pasted upon the common electrode 103 made of chromium and patterned so as to give the same pattern as that of common electrode and removing the phase difference film from the areas other than the pattern. Since in this example an UV-curable liquid crystal acrylate film was used as the phase difference film, patterning could be carried out easily by the photolithographic technique.

Subsequently, display quality of the liquid crystal display of this example was evaluated. As a result, the quality of display was high, showing a high contrast ratio, even though aperture ratio was comparable to that of the liquid crystal display of Example 3. Wide viewing angle characteristic was also confirmed.

Further, in the same manner as in Example 1, image-sticking characteristic and relaxation time of after image were quantitatively evaluated on the liquid crystal display of this invention. As a result, the relaxation time of after image was not longer than one minute, like in Example 3. In a visual examination of image quality and after image, no inhomogeneity of display due to after image and sticking of image was observed at all, demonstrating that the display characteristic was high. The driving voltage of liquid crystal was about 6.5 V which was comparable to that of Example 1.

Example 5

Next, Example 5 will be explained. In this example, a liquid crystal display was prepared by repeating the procedure of Example 4, except that the material constituting common electrode 103 was altered from ITO film to a chromium film like in Example 4, and after patterning the common electrode 103, a black-colored pigment resin containing carbon black for use as a light-shielding layer was provided on the common electrode 103 made of chromium and patterned so as to give the same pattern as that of common electrode.

Subsequently, display quality of the liquid crystal display of this example was evaluated. As a result, the quality of display was as high as in the liquid crystal display of Example 4. Wide viewing angle characteristic was also confirmed.

Further, in the same manner as in Example 1, image-sticking characteristic and relaxation time of after image were quantitatively evaluated on the liquid crystal display of this invention. As a result, the relaxation time of after image was not longer than one minute, like in Example 4. In a visual examination of image quality and after image, no inhomogeneity of display due to after image and sticking of image was observed at all, demonstrating that the display characteristic was high. The driving voltage of liquid crystal was about 6.5 V which was comparable to that of Example 1.

Example 6

Next, Example 6 will be explained. In this example, the spacer made of polymer beads used for cell gap control of liquid crystal display was replaced with a negative photosensitive acrylic resin which was coated, exposed to light and developed into a cylinder having a diameter of about 10 $\mu$m before formation of the alignment layer for the active matrix substrate. The acrylic resin layer was formed on the common electrode 103 functioning as a light-shielding layer existing on the scanning wiring 104 in the neighborhood of TFT part of each pixel, and thereafter an alignment layer was formed.

A liquid crystal display was prepared, provided that the steps other than the above-mentioned step were the same as in Example 3. On the liquid crystal display of this example, display quality was evaluated. As a result, it was confirmed that the display of this example had a high quality, showing a higher contrast ratio than that of Example 3. Wide viewing angle characteristic was also confirmed. This result is probably attributable to that, although in Example 3 a leakage of light caused by disturbance of alignment of liquid crystal around the spacer beads randomly distributed in the pixel was observed, such leakage was completely prevented in this example.

Further, in the same manner as in Example 1, image-sticking characteristic and relaxation time of after image were quantitatively evaluated on the liquid crystal display of this invention. As a result, the relaxation time of after image was not longer than one minute, like in Example 2. In a visual examination of image quality and after image, no inhomogeneity of display due to after image and sticking of image was observed at all, demonstrating that the display characteristic was high. The driving voltage of liquid crystal was about 6.5 V which was comparable to that of Example 1.

Example 7

Next, an example for the above-mentioned third embodiment will be explained by referring to FIGS. 6 and 7. In this example, glass substrates having a polished surface and having a thickness of 0.7 mm were used as substrates 101 and 102 for production of the liquid crystal display.

Thin film transistor 115 was constituted of pixel electrode 105, signal electrode 106, scanning electrode 104 and amorphous silicon 116. The scanning electrode 104 was formed by patterning an aluminum film; the common electrode wiring 120 and signal electrode 106 were formed by patterning a chromium film; and the common electrode 103 was formed by patterning an ITO film into a plane and connecting it with the common wiring electrode 120.

Gate insulating film 107 and protective insulating film 108 were made of silicon nitride and film thickness thereof was both 0.3 $\mu$m.

Thereon was patterned and formed a light-shielding film of low reflectivity by laminating a chromium film and a chromium oxide film in the boundary region between pixels.

Thereon was formed color filter layer 111 by the colored film transfer method, namely by pasting a photosensitive film consisting of a base film and a R-, G- or B-colored photosensitive resin onto the active matrix substrate, peeling off the base film, exposing the remaining portion of photosensitive film to light through a photo-mask, developing it, and post-baking it (this procedure was repeated three times, namely for R-, G- and B-colors) to form the prescribed pattern.

Subsequently, a cylindrical through-hole having a diameter of about 10 µm and reaching the source electrode 105 was formed as shown in FIG. 7B according to the photolithographic etching treatment, an acrylic resin was coated thereon, and a heat-treatment was carried out at 220° C. for one hour to form a transparent and insulating overcoat layer 112 having a dielectric constant of about 4 up to a thickness of about 0.2 µm. Due to the presence of this overcoat film 112, the unevenness in the display region due to the level difference in the pixel electrode 105 and the unevenness in the boundary region of color filter layer 111 present on the light-shielding layer between the adjacent pixels could be made even.

Subsequently, the through-hole part was again etched until the diameter reached about 7 µm, and thereon was formed a pixel electrode 103 connected to the source electrode 105 by patterning. The gap between the pixel electrode 105 and common electrode 103 was adjusted to 4 µm.

As its result, a unit pixel came to be constituted of five pixel electrodes 105 and an all-over common electrode 103 as shown in FIG. 7A. In this active matrix substrate, the number of pixels was 1,024×3×768 which was constituted of 1,024×3 (corresponding to R, G and B) signal electrodes 106 and 768 scanning electrodes 104.

Although five pixel electrodes were used in this example, it is also possible to increase the number of pixel electrodes in the interdigital part by lessening the gap in the upper region of interdigital part in accordance with the size of pixel.

Next, the alignment layer 109 and the method for alignment treatment thereof were the same as in Example 1.

In this example, rubbing method was adopted as the method for giving an alignment performance. However, other methods such as a method of coating an ultraviolet (UV light)-curable resin solution to form an alignment-controlling film and irradiating it with a polarized ultraviolet light to cause a photochemical reaction and thereby giving a liquid crystal-alignment performance, or a method of spreading an organic molecular film on a water surface, drawing up the film to form an highly aligned multi-layer film and using it as an alignment layer, can also be used. Especially, the latter two methods have hitherto been regarded as alignment-controlling methods incapable of giving a sufficiently large interfacial tilt angle. However, by combining these methods with IPS method, the practicability such as mass productivity, etc. can be improved, because IPS method requires no interfacial tilt angle theoretically unlike the vertical electric field method of which typical example is the prior TN method.

Subsequently, a cell was assembled by placing these two substrates so that their surfaces having a liquid crystal-alignment performance confronted each other through intermediation of a spacer made of dispersed globular polymer beads, and coating a sealant on the peripheral parts. The directions of rubbing of the two substrates were roughly parallel to each other, and the angle which they made with the direction of input electric field was adjusted to 15°. Into the cell was injected a nematic liquid crystal composition B in vacuum, wherein dielectric anisotropy Δε was negative and had a value of −2.2 (1 kHz, 20° C.) and the refractive anisotropy thereof Δn was 0.1 (wavelength 590 nm, 20° C.), and then it was sealed with a sealant composed of an ultraviolet (UV light)-curable resin. A liquid crystal panel having a liquid crystal layer thickness (gap) of 3.5 µm was prepared. Retardation (Δnd) of this panel was about 0.35 µm. Further, a homogeneously aligned cell was prepared by using the same alignment layer and liquid crystal composition as used in this panel, and the pre tilt angle of the liquid crystal was measured by the crystal rotation method. As a result, the pre tilt angle was about 2°. This panel was held between two polarizing plates 114, wherein the polarized light transmitting axis of one polarizing plate was made approximately parallel to the above-mentioned rubbing direction, and that of the other was made to cross therewith rectangularly. Then, a driving circuit, a back light, etc. were connected to form a module, whereby a an active matrix liquid crystal display was obtained. In this example, the normally black mode was adopted, namely a dark image was given at a low voltage and a bright image was given at a high voltage.

On the liquid crystal display of this example, display quality was evaluated. As a result, it was confirmed that the display of this example had a high quality, showing a higher aperture ratio than that of Example 1. Wide viewing angle characteristic was also confirmed.

Further, in the same manner as in Example 1, image-baking performance and relaxation time of after image were quantitatively evaluated on the liquid crystal display of this invention. As a result, the relaxation time of after image was not longer than one minute. In a visual examination of image quality and after image, no inhomogeneity of display due to after image and sticking of image was observed at all, demonstrating that the display characteristic was high. The driving voltage of liquid crystal was about 6.7 V which was comparable to that of Example 1.

Example 8

Next, Example 8 will be explained. In this example, the procedure was the same as in Example 1, except for the alignment layer used therein. Thus, a polyamic acid prepared from 4,4'-diaminodiphenylmethane as a diamine component and 1,2,3,4-cyclobutanetetracraboxylic acid dianhydride as an acid dianhydride component was printed and formed on a substrate surface and baked and imidated at 230° C. for 30 minutes. After formation of a film, the unevenness on the surface was about 20 nm. Then, the surface was irradiated with a polarized light having a wavelength of 254 nm to carry out a photo-alignment treatment.

Subsequently, a nematic liquid crystal composition A was sealed in the same manner as in Example 1 and annealed at 100° C. for 10 minutes, whereby a good alignment of liquid crystal in the direction roughly perpendicular to the direction of projected polarized light was achieved.

In the above-mentioned manner, there was obtained a liquid crystal display of which liquid crystal layer had a thickness (d) of 4.0 µm. A homogeneously aligned cell was prepared from an alignment layer using this panel and a liquid crystal composition equivalent to the above, and pre tile angle of liquid crystal was measured by the method of crystal rotation. As a result, the pre tile angle was about 1°.

Subsequently, the display quality of the liquid crystal display of this example was evaluate in the same manner as in Example 1. As a result, it was confirmed that the display quality was as high as comparable to that of Example 1. Wide viewing angle characteristic was also confirmed.

Further, in the same manner as in Example 1, image-sticking characteristic and relaxation time of after image were quantitatively evaluated on the liquid crystal display of this invention. As a result, the relaxation time of after image was not longer than one minute. In a visual examination of image quality and after image, no inhomogeneity of display due to after image and sticking of image was observed at all, demonstrating that the display characteristic was high. The driving voltage of liquid crystal was about 6.5 V which was comparable to that of Example 1.

Comparative Example 1

Next, comparative examples will be explained.

Figure 9:
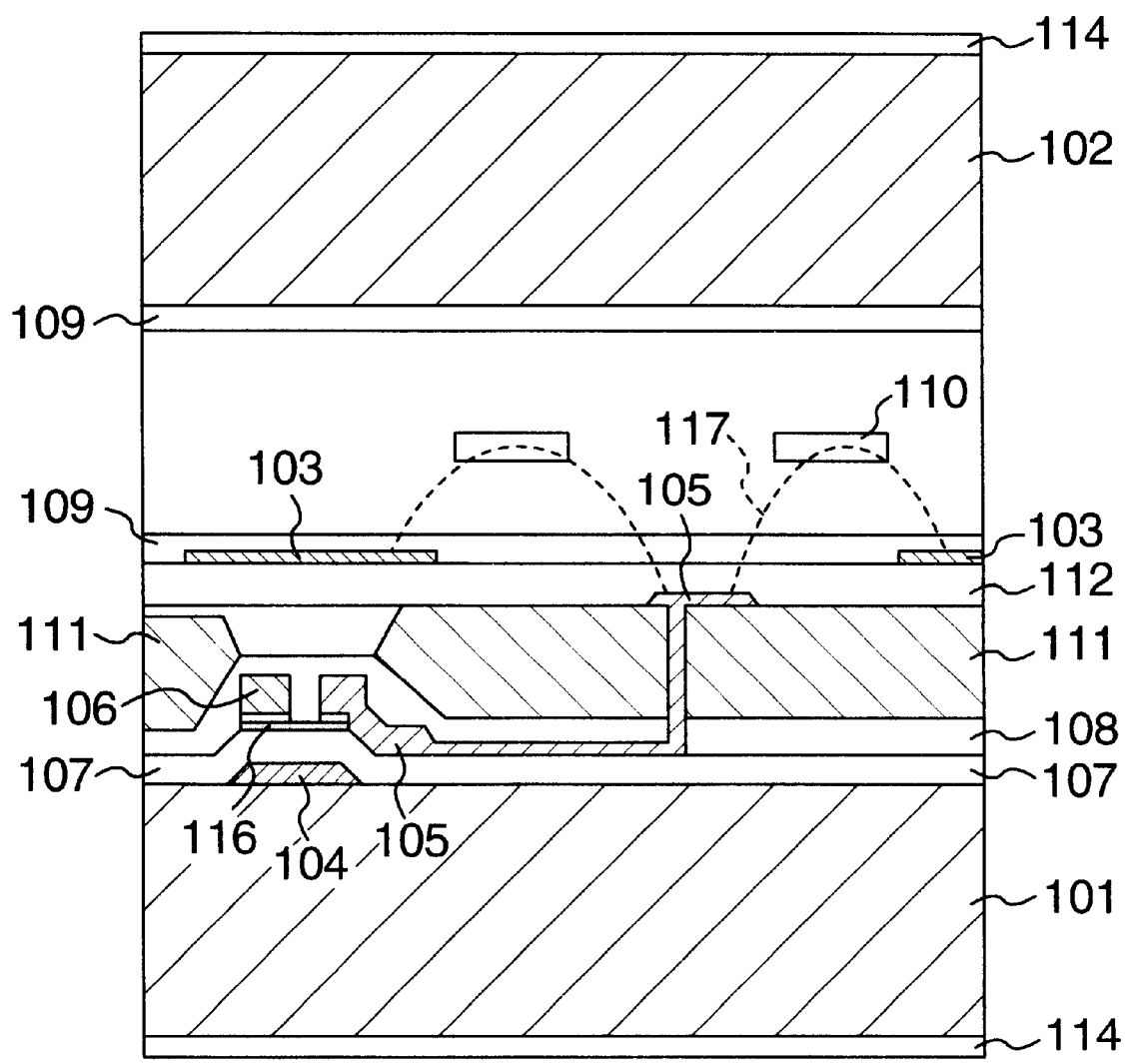
FIG. 9 is a sectional view of main part of a liquid crystal display according to a Comparative Example.

FIG. 9 illustrates Comparative Example 1, in which polished glass substrates having a thickness of 0.7 mm were used as substrates 101 and 102, in the production of the liquid crystal display.

Thin film transistor 115 was constituted of source electrode 105, signal electrode 106, scanning electrode 104 and amorphous silicon 116. The scanning electrode 104 was formed by patterning an aluminum film; and the common electrode wiring 120, signal electrode 106 and source electrode 105 were formed by patterning a chromium film.

The gate insulating film 107 and protective insulating film 108 were made of silicon nitride and both had a film thickness of 0.3 $\mu$m.

Further thereon was formed color filter layer 111 according to the pigment dispersion method. That is, pigment-dispersed resists prepared by dispersing each of R-, G- and B-colored pigments separately in a negative photosensitive acrylic resin, were coated, exposed to light through a photo-mask, developed and then post-baked (this procedure was repeated three times, namely for the R-, G- and B-colored pigments) to form a prescribed pattern.

Subsequently, a cylindrical through-hole having a diameter of about 10 $\mu$m and reaching the source electrode 105 was formed as shown in FIG. 9 according to the photolithographic etching treatment, and thereon were formed pixel electrode 105 connecting to the source electrode 105 by patterning an ITO film. Then, an acrylic resin was coated thereon, and a heat-treatment was carried out at 220° C. for one hour to form a transparent and insulating overcoat layer 112 having a dielectric constant of about 4 up to a thickness of about 0.5 $\mu$m. Due to the presence of this overcoat film 112, the unevenness in the display region due to the level difference in the pixel electrode 105 in the display region and the unevenness in the boundary region of color filter layer 111 between the adjacent pixels could be made even.

Subsequently, common electrode 103 was formed by forming a cylindrical through-hole having a diameter of about 10 $\mu$m and reaching the common electrode wiring 120 by a photolithographic etching treatment and thereon patterning an ITO film. The gap between the pixel electrode 105 and common electrode 103 was adjusted to 7 $\mu$m.

The common electrode 103 was lattice-wise formed so as to cover the upside of image signal wiring 106, scanning signal wiring 104 and thin film transistor 115, surround the pixels, and simultaneously function as a light-shielding layer.

As a result, the construction of this example was roughly the same as that of Example 2, except that two kinds of through-holes were formed in a unit pixel and the pixel electrode 105 was placed between three common electrodes 103. In the active matrix thus formed, the number of pixels was 1,024×3×768 (3 corresponded to R, G and B) constituted of 1,024×3 signal electrodes 106 and 768 scanning electrodes 104.

As shown in FIG. 9, a liquid crystal display of this example was prepared by repeating the procedure of Example 1, except that the pixel structure was as mentioned above.

Subsequently, display quality of the liquid crystal display of this comparative example was evaluate. As a result, it was confirmed that display quality of the liquid crystal display of this comparative example was as high as comparable to that of Example 1. Wide viewing angle characteristic was also confirmed.

Further, in the same manner as in Example 1, the image-sticking characteristic and relaxation time of after image were quantitatively evaluated on the liquid crystal display of this comparative example. As a result, relaxation time of after image was not shorter than 10 minutes. In a visual examination of image quality and after image, a defective display due to after image and sticking of image were clearly observed.

Comparative Example 2

Figure 10:
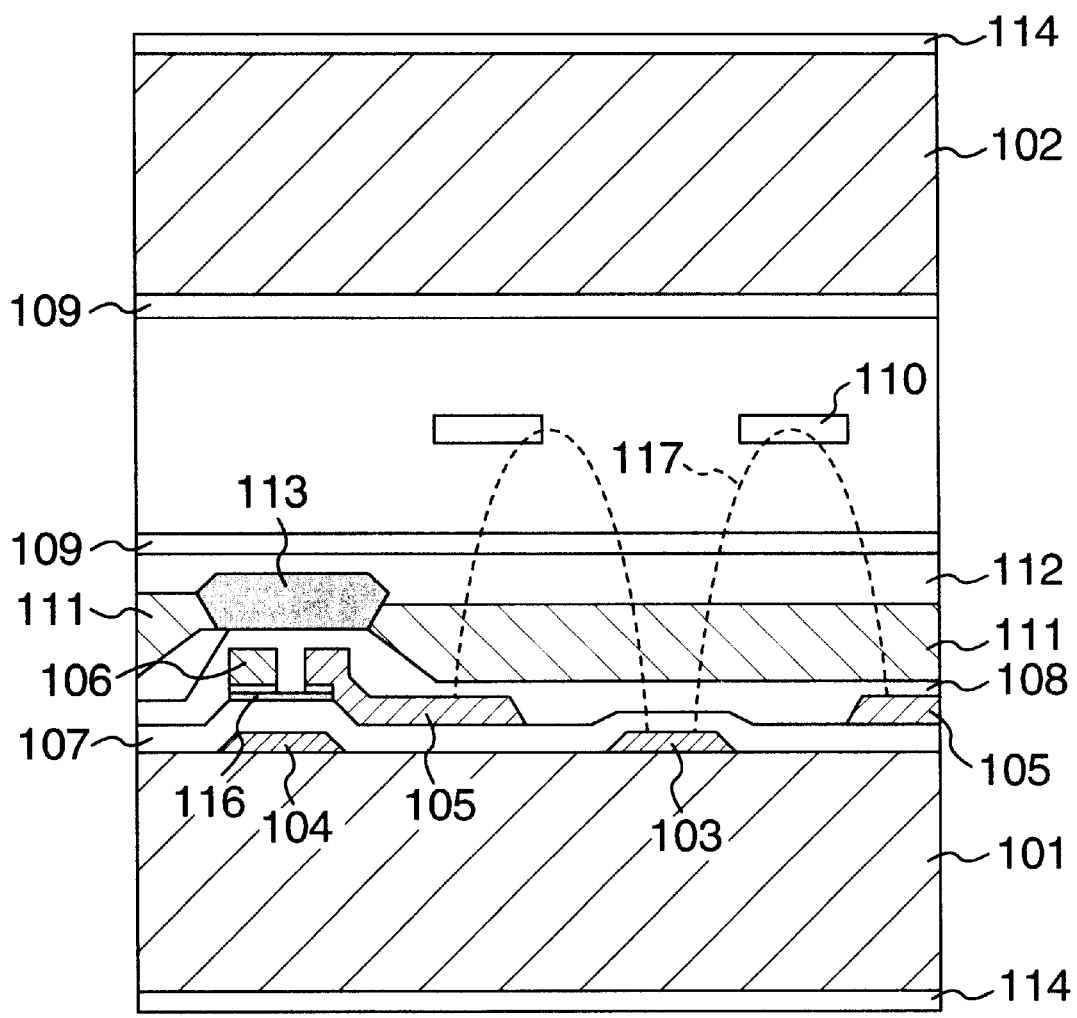
FIG. 10 is a sectional view of main part of a liquid crystal display according to another Comparative Example.

FIG. 10 illustrates Comparative Example 2, in which surface-polished glass substrates having a thickness of 0.7 mm were used as substrates 101 and 102, in the production of the liquid crystal display.

The thin film transistor 115 was constituted of pixel electrode 105, signal electrode 106, scanning electrode 104 and amorphous silicon 116. The scanning electrode 104, common electrode wiring 120, signal electrode 106, pixel electrode 105 and common electrode 103 were all formed by patterning a chromium film, and the gap between the pixel electrode 105 and common electrode 103 was adjusted to 7 $\mu$m.

The gate insulating film 107 and protective insulating film 108 were made of silicon nitride, and film thickness thereof was adjusted to 0.3 $\mu$m.

Thereon was formed color filter layer 111 according to the pigment dispersion method. That is, pigment-dispersed resists prepared by dispersing each of R-, G- and B-colored pigments separately in a negative photosensitive acrylic resin were coated, exposed to light through a photo-mask, develop and post-baked (this procedure was three times repeated, namely for R-, G- and B-color) to form a pre-scribed pattern. Then, in the same manner as above, a black matrix 113 was lattice-wise formed by exposing a polyimide resin containing a carbon black type black pigment and a positive resist used for its patterning to light, followed by development.

An acrylic resin was coated thereon and heat-treated at 220° C. for one hour to form a transparent and insulating overcoat layer 112.

As a result, an active matrix substrate was formed, of which pixel number was 1,024×3 (corresponding to R, G and B)×768 constituted of 1,024×3 signal electrodes 106 and 768 scanning electrodes 104.

Subsequently, a liquid crystal display of this comparative example shown in FIG. 10 was prepared by in the same manner as in Example 1, except for the above pixel structure.

Subsequently, display quality was evaluated on the liquid crystal display of this comparative example. As a result, it was confirmed that the display quality was as high as comparable to that of the liquid crystal display of Example 1. Wide viewing angle characteristic was also confirmed.

Further, in the same manner as in Example 1, the image-sticking characteristic and relaxation time of after image were quantitatively evaluated on the liquid crystal display of this comparative example. As a result, relaxation time of after image was not longer than one minute. In a visual examination of image quality and after image, no defective display due to after image and sticking of image was observed. However, the driving voltage of liquid crystal was about 7.6 V, which was about 1 V higher than that of Example 1.

EFFECT OF THE INVENTION

As has been described above, according to the present invention, there can be realized a liquid crystal display which can be driven at a low voltage, can show a lowered inhomogeneity of display caused by a sticking image and an after image phenomenon, and can make a display of high image quality.

What is claimed is:

1. A liquid crystal display comprising one pair of substrates which are a first substrate and a second substrate wherein at least one of the substrates is transparent, a liquid crystal layer and a color filter layer both provided between said one pair of substrates, a plurality of thin film transistors which are provided on the first substrate existing on a downside of the color filter layer and are connected to an image signal wiring and a scanning signal wiring, a common electrode giving a standard potential, and a pixel electrode connected to the thin film transistors and placed opposite to the common electrode in a pixel region, wherein said common electrode and said pixel electrode are placed in different layers from each other through an interlaminar insulating film in the form of layer comprising at least two layers comprising said color filter layer and an orientation direction of liquid crystal molecules of the liquid crystal layer is controlled by a voltage applied through the interlaminar insulating film and between the common electrode and the pixel electrode to make display.

2. The liquid crystal display comprising one pair of substrates which are a first substrate and a second substrate wherein at least one of the substrate is transparent, and a liquid crystal layer and a color filter layer both provided between said one pair of substrates, wherein said color filter layer is placed close to the first substrate and the liquid crystal layer is placed between the color filter layer and the second substrate, wherein a plurality of scanning signal wirings, a plurality of image signal wirings and a plurality of transistors connected to the image signal wirings and the scanning signal wirings are placed on the first substrate existing on a downside of the color filter layer, each region surrounded by the plurality of scanning signal wirings and the image signal wirings constitutes at least one pixel, and each pixel is provided with a common electrode connected with a common electrode wiring over a plurality of pixels to give a standard potential and a pixel electrode connected to the transistor and placed opposite to the common electrode in the pixel region, wherein said common electrode and said pixel electrode are placed in different layers from each other through an interlaminar insulating film in the form of layer comprising at least two layers comprising said color filter layer and an orientation direction of liquid crystal molecules of the liquid crystal layer is controlled by a voltage applied through the interlaminar insulating film and between the common electrode and the pixel electrode to make display.

3. The liquid crystal display according to claim 2, wherein said common electrode coats at least a part of said image signal wiring and said scanning signal wiring through an insulating film.

4. The liquid crystal display according to claim 3, wherein said insulating film is an interlaminar insulating film comprising at least two layers.

5. The liquid crystal display according to claim 2, wherein at least one layer of said interlaminar insulating film is made of an organic substance.

6. The liquid crystal display according to claim 2, wherein an insulating overcoat layer is provided in a boundary part between two kinds of color filter layers on said image signal wiring or said scanning signal wiring, and said common electrode is formed on said overcoat layer.

7. The liquid crystal display according to claim 2, wherein an overcoat layer for protecting said color filter is provided on an upside of said color filter layer, and said common electrode is formed on said overcoat layer.

8. The liquid crystal display according to claim 2, wherein said common electrode or said common electrode wiring is formed lattice-wise so as to surround said pixel.

9. The liquid crystal display according to claim 2, wherein an overcoat layer for protecting said color filter is provided on an upside of said color filter layer, and said pixel electrode is formed on said overcoat layer.

10. The liquid crystal display according to claim 2, wherein said overcoat layer or said interlaminar insulating film is made of a photosensitive resin.

11. The liquid crystal display according to claim 2, wherein at least one member selected from the group consisting of said pixel electrode and said common electrode is constituted of a transparent electrode.

12. The liquid crystal display according to claim 11, wherein said transparent electrode is constituted of an ion doped titanium oxide film or an ion doped zinc oxide (ZnO) film.

13. The liquid crystal display according to claim 2, wherein said common electrode or said common electrode wiring is made of an alloy containing at least one member selected from the group consisting of Al, Cr, Mo, Ta and W.

14. The liquid crystal display according to claim 13, wherein an antireflection layer is formed on an upside of said common electrode or said common electrode wiring.

15. The liquid crystal display according to claim 14, wherein a film containing a black-colored pigment is formed as said antireflection layer.

16. The liquid crystal display according to claim 14, wherein a phase difference film is laminated as said antireflection layer.

17. The liquid crystal display according to claim 14, wherein said common electrode or said common electrode wiring is formed into a laminated structure containing a magnetic material as said antireflection layer.

18. The liquid crystal display according to claim 2, wherein the alignment direction of the liquid crystal molecule at two interfaces between said liquid crystal layer and alignment layers formed on said one pair of substrates are nearly in the same direction.

19. The liquid crystal display according to claim 18, wherein at least one of the alignment layers formed on said one pair of substrates is a photo-reactive material layer.

20. The liquid crystal display according to claim 2, wherein a pre tilt angle of said liquid crystal layer is 5 degrees or less.

* * * * *